United States Patent
Sadr et al.

(10) Patent No.: US 9,312,987 B2
(45) Date of Patent: *Apr. 12, 2016

(54) COLLISION DETECTION USING A MULTIPLE SYMBOL NONCOHERENT SOFT OUTPUT DETECTOR

(71) Applicant: Mojix, Inc., Los Angeles, CA (US)

(72) Inventors: Ramin Sadr, Los Angeles, CA (US); Dariush Divsalar, Pacific Palisades, CA (US)

(73) Assignee: Mojix, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,863

(22) Filed: Apr. 8, 2015

(65) Prior Publication Data

US 2015/0215073 A1  Jul. 30, 2015

Related U.S. Application Data

(63) Continuation of application No. 13/831,825, filed on Mar. 15, 2013, now Pat. No. 9,008,239, which is a continuation-in-part of application No. 13/414,616, filed on Mar. 7, 2012.

(60) Provisional application No. 61/449,869, filed on Mar. 7, 2011.

(51) Int. Cl.
  *H04L 27/06* (2006.01)
  *H04L 1/00* (2006.01)
  (Continued)

(52) U.S. Cl.
  CPC ........ *H04L 1/0054* (2013.01); *H04L 25/03171* (2013.01); *H04L 25/067* (2013.01); *H04L 27/0012* (2013.01); *H04L 27/233* (2013.01)

(58) Field of Classification Search
  CPC .............................. H04L 1/0054; H03M 13/41

USPC ......... 375/341, 259, 262, 322, 324, 332, 340; 370/340; 714/780, 794

See application file for complete search history.

(56) References Cited

U.S. PATENT DOCUMENTS

| 5,040,191 A | * | 8/1991 | Forney et al. | .................. 375/263 |
| 5,369,404 A | * | 11/1994 | Galton | .......................... 341/143 |

(Continued)

FOREIGN PATENT DOCUMENTS

| EP | 1313249 A2 | 5/2003 |
| EP | 1362320 A2 | 11/2003 |

(Continued)

OTHER PUBLICATIONS

Extended European Search Report for European Application No. EP15164416.8, Report Completed Aug. 21,2015, Mailed Aug. 31,2015, 5 Pgs.

(Continued)

*Primary Examiner* — Khai Tran
(74) *Attorney, Agent, or Firm* — KPPB LLP

(57) ABSTRACT

Systems and methods for detecting collisions in radio frequency tags in accordance with embodiments of the invention are disclosed. In one embodiment, a receiver system includes a receiver configured to receive and sample a phase modulated input signal, and a multiple symbol noncoherent soft output detector configured to receive the sampled input signal and to generate a soft metric indicative of the reliability of a detected symbol based upon observations over multiple symbols, a collision detector configured to calculate a decision metric from a set of soft metrics generated by the multiple symbol noncoherent soft output detector and detect a collision when the decision metric satisfies a predetermined criterion.

20 Claims, 23 Drawing Sheets

(51) Int. Cl.
*H04L 25/03* (2006.01)
*H04L 25/06* (2006.01)
*H04L 27/00* (2006.01)
*H04L 27/233* (2006.01)

(56) References Cited

U.S. PATENT DOCUMENTS

| | | |
|---|---|---|
| 5,684,832 A | 11/1997 | Adachi et al. |
| 5,955,966 A | 9/1999 | Jeffryes et al. |
| 6,233,290 B1 | 5/2001 | Raphaeli |
| 6,750,757 B1 | 6/2004 | Gabig, Jr. et al. |
| 6,836,472 B2 | 12/2004 | O'toole et al. |
| 7,076,000 B2 | 7/2006 | Rodriguez |
| 7,418,065 B2 | 8/2008 | Qiu et al. |
| 7,599,441 B2 | 10/2009 | Ma et al. |
| 7,633,377 B2 | 12/2009 | Sadr |
| 8,400,271 B2 | 3/2013 | Sadr |
| 8,552,835 B2 | 10/2013 | Sadr |
| 8,941,472 B2 | 1/2015 | Sadr |
| 8,981,908 B2 | 3/2015 | Sadr |
| 9,008,239 B2 * | 4/2015 | Sadr et al. .............. 375/341 |
| 2001/0001616 A1 | 5/2001 | Rakib et al. |
| 2001/0017898 A1 | 8/2001 | Raheli et al. |
| 2001/0022813 A1 | 9/2001 | Tan et al. |
| 2002/0057729 A1 | 5/2002 | Farbod et al. |
| 2002/0113736 A1 | 8/2002 | Toutain et al. |
| 2002/0122472 A1 | 9/2002 | Lay |
| 2002/0131515 A1 | 9/2002 | Rodriguez |
| 2002/0159540 A1 | 10/2002 | Chiodini |
| 2003/0138055 A1 | 7/2003 | Saito et al. |
| 2004/0001460 A1 | 1/2004 | Bevan et al. |
| 2004/0042539 A1 | 3/2004 | Vishakhadatta et al. |
| 2004/0067764 A1 | 4/2004 | Pratt et al. |
| 2005/0271165 A1 | 12/2005 | Geraniotis et al. |
| 2005/0280508 A1 | 12/2005 | Mravca et al. |
| 2006/0022800 A1 | 2/2006 | Krishna et al. |
| 2006/0094391 A1 | 5/2006 | Darabi |
| 2006/0103576 A1 | 5/2006 | Mahmoud et al. |
| 2006/0170565 A1 | 8/2006 | Husak et al. |
| 2007/0032241 A1 | 2/2007 | Busch et al. |
| 2008/0186231 A1 | 8/2008 | Aljadeff et al. |
| 2008/0197982 A1 | 8/2008 | Sadr |
| 2009/0135800 A1 | 5/2009 | McPherson |
| 2010/0310019 A1 | 12/2010 | Sadr |
| 2012/0275546 A1 | 11/2012 | Divsalar |
| 2013/0147608 A1 | 6/2013 | Sadr |
| 2013/0202062 A1 | 8/2013 | Sadr et al. |
| 2014/0218172 A1 | 8/2014 | Sadr |
| 2015/0169909 A1 | 6/2015 | Sadr |

FOREIGN PATENT DOCUMENTS

| | | |
|---|---|---|
| JP | 2005136570 A | 5/2005 |
| WO | 1994029990 | 12/1994 |
| WO | 02065380 A2 | 8/2002 |
| WO | 2005101652 A1 | 10/2005 |
| WO | 2014151943 A1 | 9/2014 |

OTHER PUBLICATIONS

International Preliminary Report on Patentability for International Application No. PCT/US2014/026707, Report Issued Sep. 15, 2015, Mailed Sep. 24, 2015, 5 Pgs.

International Search Report and Written Opinion for International Application No. PCT/US2006/060339, filed Oct. 27, 2006, search completed Jul. 7, 2008, mailed Jul. 21, 2008, 5 pages.

Supplementary European Search Report for Application No. EP 06850079, International Filing Date Oct. 27, 2006, Search Completed Dec. 12, 2013, 7 pgs.

International Search Report and Written Opinion for International Application PCT/US2014/026707, International Filing Date Mar. 13, 2014, Report Completed Jun. 28, 2014, Mailed Aug. 1, 2014, 6 pages.

Chevillat et al., "Decoding of Trellis-Encoded Signals in the Presence of Intersymbol Interference and Noise", IEEE Transactions on Communications, 1989, vol. 37, No. 7, pp. 669-676.

Divsalar et al., "Multiple-Symbol Differential Detection of MPSK", IEEE Transactions on Communications, Mar. 1990, vol. 38, No. 3, pp. 300-308.

EPCGLOBAL, EPC standard, Published Jan. 26, 2005, 94 pgs.

Forney, Jr., "Maximum-Likelihood Sequence Estimation of Digital Sequences in the Presence of Intersymbol Interference", IEEE Transactions on Information Theory, May 1972, vol. IT-18, No. 3, pp. 363-378.

Kerpez, "Viterbi Receivers in the Presence of Severe Intersymbol Interference", IEEE Xplore, downloaded on Jan. 21, 2009, pp. 2009-2013.

Makrakis et al., "Optimal Noncoherent Detection of PSK Signals", IEEE Electronics Letters, Mar. 15, 1990, vol. 26, No. 6, pp. 398-400.

Sadr et al., "Generalized Minimum Shift-Keying Modulation Techniques", IEEE Transactions on Communications, Jan. 1988, vol. 36, No. 1, pp. 32-40.

* cited by examiner

COLLISION DETECTION USING A MULTIPLE SYMBOL NONCOHERENT SOFT OUTPUT DETECTOR

CROSS-REFERENCE TO RELATED APPLICATION

The present invention is a continuation of U.S. application Ser. No. 13/831,825 entitled "Collision Detection Using a Multiple Symbol Noncoherent Soft Output Detector," filed Mar. 15, 2013, which application claims priority under 35 U.S.C. §120 as a Continuation-In-Part of U.S. patent application Ser. No. 13/414,616 entitled "Multiple Symbol Noncoherent Soft Output Detector," to Dariush Divsalar filed Mar. 7, 2012, which application claims priority under 35 U.S.C. §119(e) to U.S. Provisional Patent Application Ser. No. 61/449,869 entitled "LLR for Symbol Stream Combining of FM0 with Preamble and Pilot," filed Mar. 7, 2011, the disclosures of which are incorporated by reference herein in its entirety.

FIELD OF THE INVENTION

The present invention relates to communication systems and more specifically to detection of tag collisions using a multiple symbol noncoherent soft output detector.

BACKGROUND

In many applications, noncoherent or differential detection is an attractive alternative to coherent detection due to the simplicity of implementation and/or where the transmission environment is sufficiently degraded, e.g., a multipath fading channel, that acquiring and tracking a coherent demodulation reference signal is difficult if not impossible. A noncoherent detector is a detector that does not directly estimate the phase of the received signal. Although differential detection removes the need for carrier acquisition and tracking in the receiver, it suffers from a performance penalty (additional required SNR at a given bit error rate) when compared to ideal (perfect carrier phase reference) coherent detection. The amount of this performance penalty increases with the number of phases M and is significant for M≥4. Dariush Divsalar and Marvin K. Simon, in their paper entitled "Multiple-Symbol Differential Detection of MPSK," IEEE Transactions on Communications, March 1990 (the disclosure of which is incorporated by reference in its entirety), presented a differential detection technique involving making a joint decision on several symbols simultaneously as opposed to symbol-by-symbol detection. The multiple symbol differential detection technique is a form of maximum-likelihood sequence estimation and assumes that carrier phase is constant during the extended observation interval, which is typically a reasonable assumption for observations of the order of three or four symbol observations. The multiple symbol differential detector described by Dr. Divsalar and Dr. Simon performs hard decisions. A hard decision is a decision between a fixed set of possible values (e.g. 0 or 1). In a soft output detector, each bit in the output also takes on a value indicating reliability.

SUMMARY OF THE INVENTION

Systems and methods for detecting collisions in radio frequency tags in accordance with embodiments of the invention are disclosed. In one embodiment, a receiver system includes a receiver configured to receive and sample a phase modulated input signal, and a multiple symbol noncoherent soft output detector configured to receive the sampled input signal and to generate a soft metric indicative of the reliability of a detected symbol based upon observations over multiple symbols, a collision detector configured to calculate a decision metric from a set of soft metrics generated by the multiple symbol noncoherent soft output detector and detect a collision when the decision metric satisfies a predetermined criterion.

In a further embodiment, the soft metric is the Log Likelihood Ratio of the detected symbol based upon observations over multiple symbols.

In another embodiment, the observations include observations over a two symbol sequence.

In a still further embodiment, the observations include observations over a three symbol sequence.

In still another embodiment, the set of soft metrics generated by the multiple symbol noncoherent soft output detector are generated based upon observations of a unique sequence of symbols identifying an RFID tag.

In a yet further embodiment, the unique sequence of symbols identifying an RFID tag is an RN16 transmission.

In yet another embodiment, the decision metric is based upon a central moment of the distribution of the set of soft metrics generated by the multiple symbol noncoherent soft output detector.

In a further embodiment again, the decision metric is normalized over a power of the first moment of the distribution of the set of soft metrics generated by the multiple symbol noncoherent soft output detector.

In another embodiment again, the predetermined criterion is the decision metric exceeding a threshold.

In a further additional embodiment, the phase modulated input signal includes a preamble sequence and the threshold is based upon the preamble correlation normalized by the number of one half symbols used in the preamble.

In another additional embodiment, the decision metric is a count of the number of soft metrics in the set of soft metrics generated by the multiple symbol noncoherent soft output detector.

In a still yet further embodiment, the phase modulated input signal includes data that is phase modulated on a carrier and the multiple symbol differential detector assumes that carrier phase of the input signal is constant over the time duration of the observations.

In still yet another embodiment, the phase modulated input signal is a binary phase modulated signal.

In a still further embodiment again, the phase modulated input signal is an FM0 modulated signal.

In still another embodiment again, the phase modulated input signal is a Multiple-Phase-Shift Keying modulated signal.

In a still further additional embodiment, the multiple symbol differential detector includes a plurality of matched filters having different numbers of samples configured to integrate the samples during each half-symbol period, and the multiple symbol differential detector is configured to use the outputs of each of the plurality of matched filters to determine the most likely symbol duration.

Still another additional embodiment also includes an antenna configured to receive a phase modulated signal that includes symbols transmitted by an RFID tag.

A yet further embodiment again includes receiving and sampling a phase modulated input signal to produce symbol samples, combining symbol samples to produce symbol observations, generating a soft metric indicative of the reliability of a detected symbol based upon symbol observations over multiple symbols, and calculating a decision metric from a set of generated soft metrics, and detecting a collision in received radio frequency transmissions when the calculated decision metric satisfies a predetermined criterion.

In yet another embodiment again, the soft metric is the Log Likelihood Ratio of the detected symbol based upon observations over multiple symbols.

In a yet further additional embodiment, the observations include observations over a two symbol sequence.

In yet another additional embodiment, the observations include observations over a three symbol sequence.

In a further additional embodiment again, the set of generated soft metrics were generated based upon observations of a unique sequence of symbols identifying an RFID tag.

In another additional embodiment again, the unique sequence of symbols identifying an RFID tag is an RN16 transmission.

In a still yet further embodiment again, the decision metric is based upon a central moment of the distribution of the set of generated soft metrics.

In still yet another embodiment again, the decision metric is normalized over a power of the first moment of the distribution of the set of generated soft metrics.

In a still yet further additional embodiment, the predetermined criterion is the decision metric exceeding a threshold.

In still yet another additional embodiment, the phase modulated input signal includes a preamble sequence and the threshold is based upon the preamble correlation normalized by the number of one half symbols used in the preamble.

In a yet further additional embodiment again, the decision metric is a count of the number of soft metrics in the set of generated soft metrics that are below a second threshold.

In yet another additional embodiment, the phase modulated input signal includes data that is phase modulated on a carrier, and the multiple symbol differential detector assumes that carrier phase of the input signal is constant over the time duration of the observations.

In a still yet further additional embodiment again, the phase modulated input signal is a binary phase modulated signal.

In still yet another additional embodiment again, the phase modulated input signal is an FM0 modulated signal.

In another further embodiment, the phase modulated input signal is a Multiple-Phase-Shift Keying modulated signal.

In still another further embodiment, combining symbol samples to produce symbol observations also includes using a plurality of matched filters having different numbers of samples to integrate the symbol samples during each half-symbol period and determining the most likely symbol duration using the integrated symbol samples.

DETAILED DESCRIPTION

Turning now to the drawings, multiple symbol noncoherent soft output detectors that generate soft metrics indicating the reliability of detected data in accordance with embodiments of the invention are illustrated. In many embodiments, the multiple symbol noncoherent soft output detector determines soft metrics based on the log likelihood ratio (LLR) for each detected symbol using observations with respect to multiple symbols. For received sequences including pilot, preamble, and data symbols, where the pilot and preamble are known to the detector, the observations utilized to determine the soft metrics for each symbol can include observations of some or all of the symbols in the pilot and/or preamble and a short sequence of multiple data symbols. In several embodiments, a short sequence of two or three unknown data symbols is utilized when generating the soft metric for an unknown data symbol. In other embodiments, a sequence of any number of symbols can be utilized to determine the soft metrics.

The ability of multiple symbol noncoherent soft output detectors in accordance with embodiments of the invention to produce soft metrics enables the output of more than one receiver to be utilized in the detection of a transmitted data sequence. In a number of embodiments, soft metrics generated by a set of multiple symbol noncoherent soft output detectors can be combined to improve the reliability of the detected data sequence. In several embodiments, the soft metrics can be used to discard the output of one or more multiple symbol noncoherent soft output detectors in a set of multiple symbol noncoherent soft output detectors when detecting data. In addition, the soft metrics can be utilized to select the most reliable output as the detected data sequence. Multiple symbol noncoherent soft output detectors and the use of LLRs when performing multiple symbol noncoherent detection in accordance with embodiments of the invention are discussed further below. In order to illustrate multiple symbol noncoherent detection techniques in accordance with embodiments of the invention, examples are provided with respect to the FMO modulation technique used in common Radio Frequency Identification (RFID) applications. However, multiple symbol noncoherent soft output detectors in accordance with embodiments of the invention can be utilized in any of a variety of applications including applications involving Multiple Phase Shift Keying, and/or wireless, wired, optical communication channels and systems with channel coding.

Figure 1:
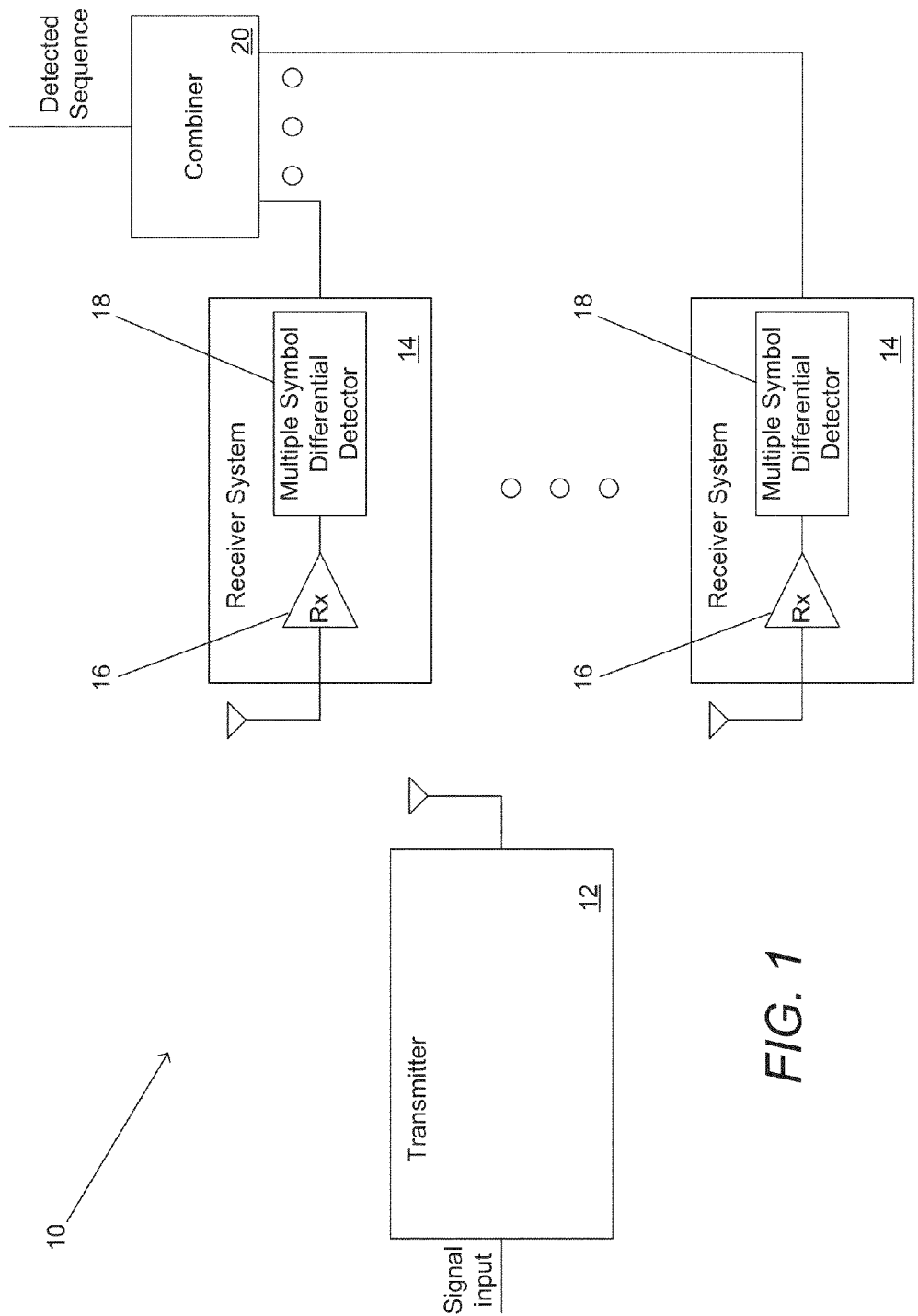
FIG. 1 conceptually illustrates a communication system in accordance with an embodiment of the invention.

Communication Systems Including Multiple Symbol Noncoherent Soft Output Detectors One or more multiple symbol noncoherent soft output detectors in accordance with embodiments of the invention can be utilized to detect data in almost any communication system that modulates the phase of the transmitted signal to communicate information and where the phase of the carrier signal on which the data is modulated remains relatively constant during the transmission of the data sequence. A communication system including a set of multiple symbol noncoherent soft output detectors in accordance with embodiments of the invention is illustrated in FIG. 1. The communication system 10 includes a transmitter 12 that modulates data symbols onto a carrier for transmission via a communication channel to one or more receiver systems 14. In the illustrated embodiment, a set of receiver systems 14 is provided and each receiver system includes a receiver 16 and a multiple symbol noncoherent soft output detector 18. The receivers 16 demodulate and sample the received signal. The samples are provided to the corresponding multiple symbol noncoherent soft output detector 18, which outputs soft metrics based upon the observations (i.e. the samples).

In several embodiments, the soft metrics based on the LLR are in fact the LLR of each symbol. In a number of embodiments, the soft metrics based on the LLR are approximations of the magnitude or square of the magnitude of the LLR. In other embodiments, any soft metric that provides information concerning the reliability of the detected symbol can be utilized. The soft metrics can be utilized to detect a received data sequence. In combined receiver systems where only one receiver system is present, the soft metrics output by the multiple symbol noncoherent soft output detector can be utilized to generate the received data sequence. In the illustrated embodiment, the soft metrics output by the multiple symbol noncoherent soft output detectors 18 are provided to a combiner 20. In a number of embodiments, the combiner 20 selects as the detected output a symbol or sequence of symbols based upon the output of the multiple symbol noncoherent soft output detector 18 that detects the symbol or sequence of symbols with the highest reliability. In several embodiments, combiner 20 combines the soft metrics from two or more of the multiple symbol noncoherent soft output detectors to generate the detected data sequence. The soft metrics utilized to generate the detected data sequence can be selected based upon reliability. Alternatively, the combiner 20 can simply combine the soft metrics of all of the multiple symbol noncoherent soft output detectors without regard to the reliability of any specific output.

Although the communication system shown in FIG. 1 shows the use of an antenna 20 to transmit the signal via free space, multiple symbol noncoherent soft output detectors in accordance with embodiments of the invention can be utilized in a variety of communication system including (but not limited to) wireless, wired, optical communication systems and systems with channel coding. An application of particular interest for multiple symbol noncoherent soft output detectors in accordance with embodiments of the invention is the detection of FMO modulated data transmitted by Radio Frequency Identification (RFID) tags such as (but not limited to) Ultra High Frequency RFID tags that conform with the EPC Class 1 Generation 2 UHF Air Interface Protocol (EPC Gen 2) Standard specified by GS1 AISBL of Brussels, Belgium. Accordingly, much of the discussion that follows is in the context of detecting FMO modulated signals. However, multiple symbol noncoherent soft output detectors in accordance with embodiments of the invention can generate soft metrics with respect to symbols generated using a variety of phase modulation techniques including (but not limited to) Multiple-Phase-Shift Keying (MPSK). If there is no known data available (e.g. no known pilot, or preamble) the modulation scheme used to transmit the data should inherently include differential encoding or a differential encoder should be used. However, if some known data is available a modulation scheme that does not include differential encoding can be used. Systems and methods for generating soft metrics in accordance with embodiments of the invention are discussed further below.

Generating Soft Metrics Using Multiple Symbol Noncoherent Soft Output Detection

Multiple symbol noncoherent soft output detectors in accordance with embodiments of the invention detect received symbols by generating soft metrics using observations of multiple symbols. In several embodiments, the multiple symbol noncoherent soft output detector generates soft metrics based on the LLR of each detected symbol. In order to illustrate the manner in which soft metrics based on LLRs can be utilized in the detection of a sequence of symbols, the following example is provided with respect to the detection of FMO modulated symbols generated in accordance with the EPC Gen 2 standard. As is discussed further below, each data packet transmitted in accordance with the EPC Gen 2 standard includes a known pilot and preamble, which can be utilized by the receiver to improve the reliability of the detected data. Similar techniques can be utilized in communication systems that utilize other phase modulation techniques and/or for which the receiver system knows a portion of the transmitted sequence.

LLRs for FMO Symbol Stream Including Pilot and Preamble Sequences

Figure 2A:
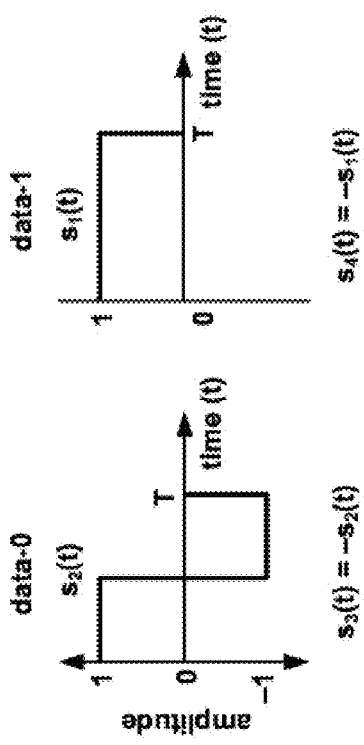
FIGS. 2A-2E illustrate the characteristics of FM0 modulated signals transmitted in accordance with the EPC Class 1 Generation 2 UHF Air Interface Protocol Standard.
Figure 2E:
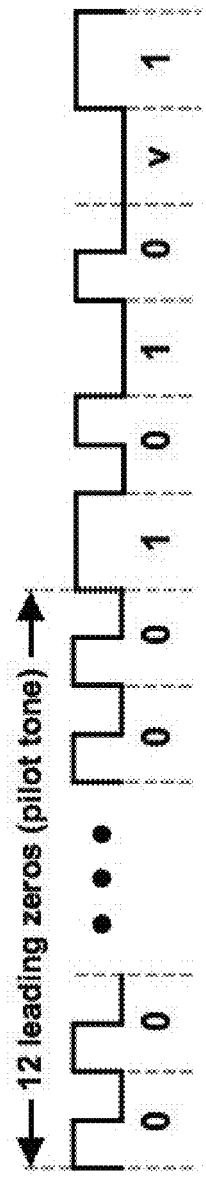
Figure 2B:
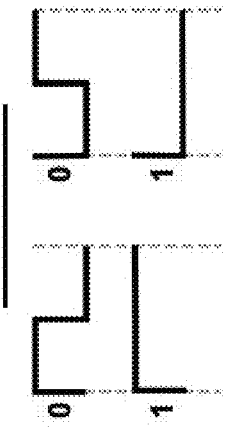
Figure 2C:
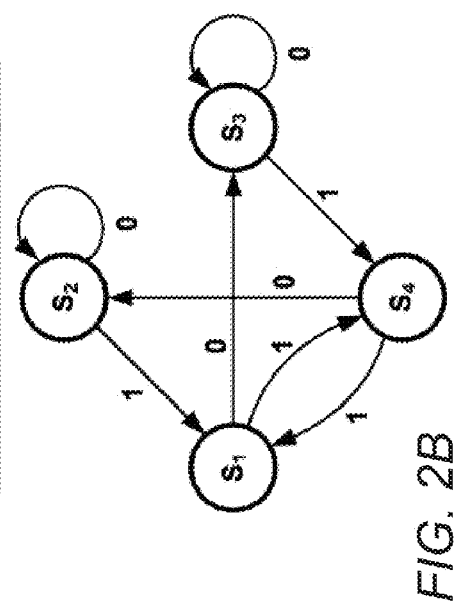
Figure 2D:
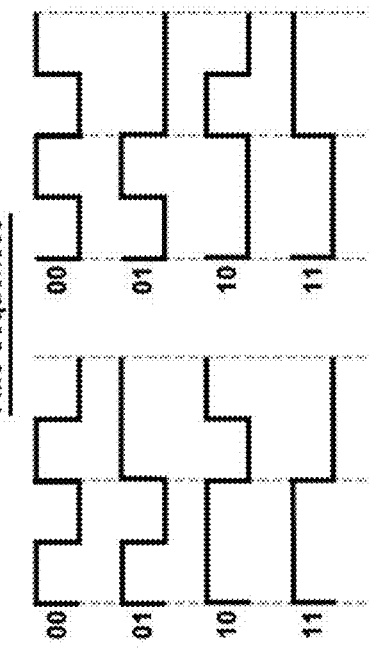

The FMO basis functions are illustrated in FIG. 2A. A state diagram illustrating the manner in which FMO modulated symbols are generated is illustrated in FIG. 2B. As can readily be appreciated from the state diagram, each FMO symbol that is transmitted depends on the previous symbol. FMO symbols transmitted depending upon the value of the previous symbol are illustrated in FIG. 2C. Two bit (two symbol) FMO sequences are illustrated in FIG. 2D. The EPC Gen 2 standard specifies that a RFID tag can transmit FMO modulated data preceded by a preamble. The interrogator can also request that the RFID tag initiate the transmission with a pilot sequence of 12 leading FMO zeros. The pilot and preamble sequence of a packet transmitted in accordance with the EPC Gen 2 Standard is illustrated in FIG. 2E. Both the pilot and preamble are known to the receiver system. The detection of FMO modulated data utilizing observations of the pilot and preamble in the generation of soft metrics is discussed further below. Increasing the number of observations using the pilot and preamble typically improves the reliability of the detected data sequence. Use of observations of known symbols is not, however, necessary to detect data using a multiple symbol noncoherent soft output detector in accordance with embodiments of the invention.

Consider the FMO signaling where a data $d_k \in \{\pm1\}$ generates data $x_{k,1} \in \{\pm1\}$ and $x_{k,2} \in \{\pm1\}$ such that $x_{k,2}=d_k x_{k-1,2}$ and $x_{k,1}=-x_{k,2}$.

Let $p_{k,i} \in \{\pm1\}$; k=1, ... $N_p$; i=1, 2 represent the pilot and preamble samples which are known to the receiver. Let $x_{k,i} \in \{\pm1\}$; k=1, ..., $N_d$, i=1, 2 represent the data. The index i=1 represents the first half symbol, and i=2 represents the second half symbol for each time index k. Let $y_{k,i}$; k=1, ..., $N_p$ and $r_{k,i}$; k=1, ..., $N_d$; i=1, 2 represent the corresponding noisy complex received samples after half-symbol integrations (half symbol matched filtering). As is discussed further below, due to timing uncertainty, a number of matched filters having different numbers of samples can be utilized to integrate the samples during each half-symbol period to determine the most likely symbol duration. In the case of FMO, the integration typically commences halfway through the symbol interval. The carrier phase $\phi$ (uniformly distributed between 0 and $2\pi$) can be assumed to be almost constant over time duration of pilot, preamble, and data during reception of a packet. Let $I_{m,n}$ represent a set of time indices k and i corresponding to a received data observation interval. In particular the assumption can be made that this set starts with k=m−1, i=2 and ends with k=m+n, i=1. The conditional probability is $$P(r|p,x,\varphi) = c_1 e^{\frac{A}{\sigma^2} Re\left(\sum_{k,i} y_{k,i} p_{k,i} e^{-j\varphi} + \sum_{k,i \in I_{m,n}} r_{k,i} x_{k,i} e^{-j\varphi}\right)} \quad (1)$$

where $c_1$ is a constant which depends only on observations. The expectation with respect to carrier phase $\phi$ is $$P(r|p,x) = E\{P(r|p,x,\varphi)\} \quad (2)$$

$$= c_1 I_0\left(\frac{A}{\sigma^2}\left|\sum_{k,i} y_{k,i} p_{k,i} + \sum_{k,i \in I_{m,n}} r_{k,i} x_{k,i}\right|\right)$$

Note that $\sum_{k,i \in I_{m,n}} r_{k,i} x_{k,i} = \sum_{k=m}^{m+n}(r_{k-1,2}-r_{k,1})x_{k-1,2}$ The LLR then can be computed as $$\lambda_k = \ln \frac{P(x_k=+1|p,r)}{P(x_k=-1|p,r)} = \ln \frac{\sum_{x:x_k=+1} P(x|p,r)}{\sum_{x:x_k=-1} P(x|p,r)} \quad (3)$$

For independent identically distributed data, the following approximation applies $$\lambda_k = \ln \frac{\sum_{x:x_k=+1} P(r|p,x)}{\sum_{x:x_k=-1} P(r|p,x)} \cong \ln \frac{max_{x:x_k=+1} P(r|p,x)}{max_{x:x_k=-1} P(r|p,x)} \quad (4)$$

or $$\lambda_k \cong max_{x:x_k=+1} \ln P(r|p,x) - max_{x:x_k=-1} \ln P(r|p,x) \quad (5)$$

Using $\ln\{I_0(x)\} \cong x$, then for some $j \in \{m, ..., m+n\}$ the LLR can be obtained as $$\lambda_j \cong \frac{A}{\sigma^2} \left\{ \max_{x:x_j=+1} \left|\sum_{k,i} y_{k,i} p_{k,i} + \sum_{k=m}^{m+n}(r_{k-1,2}-r_{k,1})x_{k-1,2}\right| - \max_{x:x_j=-1}\left|\sum_{k,i} y_{k,i} p_{k,i} + \sum_{k=m}^{m+n}(r_{k-1,2}-r_{k,1})x_{k-1,2}\right|\right\} \quad (6)$$

Although the above formulation assumes that the phase modulation takes one of two values, a multiple symbol noncoherent soft output detector can be constructed in accordance with embodiments of the invention that generates a LLR with respect to each possible symbol in an M-ary PSK modulation scheme. In several embodiments, the soft metric is determined relative to the likelihood of an arbitrarily selected reference symbol value. Referring back to the case where the phase can take one of two values, the generation of LLRs using observations over 3-symbol FMO modulated sequences in accordance with embodiments of the invention is discussed below.

LLR for 3-Bit Duration

Assuming that time synchronization is already acquired, the term $|\Sigma_{k,i} y_{k,i} p_{k,i} + \Sigma_{k=m}^{m+n}(r_{k-1,2}-r_{k,1})x_{k-1,2}|$ can be written for a 3-bit (3 symbol) estimation as $$\left|\sum_{k,i} y_{k,i} p_{k,i} + (r_{m-1,2}-r_{m,1})x_{m-1,2} + (r_{m,2}-r_{m+1,1})x_{m,2} + (r_{m+1,2}-r_{m+2,1})x_{m+1,2}\right| \quad (7)$$

Since $x_{m,2}=d_m x_{m-1,2}$, $x_{m+1,2}=d_{m+1} d_m x_{m-1,2}$ (7) can be rewritten as $$f(x_{m-1,2}, d_m, d_{m+1}, t) \triangleq \quad (8)$$
$$\left|\sum_{k,i} y_{k,i} p_{k,i} + x_{m-1,2}[(r_{m-1,2}-r_{m,1}) + (r_{m,2}-r_{m+1,1})d_m + (r_{m+1,2}-r_{m+2,1})d_m d_{m+1}]\right|$$

where t corresponds to timing index.

The detector of an RFID receiver such as the RFID Receiver described in U.S. Pat. No. 7,633,377 entitled "RFID Receiver" to Ramin Sadr (the disclosure of which is incorporated by reference herein in its entirety) can be replaced with a multiple symbol noncoherent soft output detector in accordance with an embodiment of the invention. The RFID receiver described in U.S. Pat. No. 7,633,377 provides time synchronization using the pilot and preamble symbols to within +/−1 sample. For punctual timing (no timing error) set t=0, for early timing (by one sample forward) set t=+1, and for late timing (by one sample backward) set t=−1. This index t namely −1, 0, or +1 corresponds to the starting time of matched filtering (integrate and dump for FMO pulses). When time synchronization is provided with respect to t=−1, 0, and +1, soft metrics for each time index can be obtained as follows using a multiple symbol noncoherent soft output detector in accordance with embodiments of the invention.

With these notations then the conditional LLR for time index t for information data is $$\lambda(d_m, t) = \frac{A}{\sigma^2}\left\{\max_{x_{m-1,2}, d_{m+1}} f(x_{m-1,2}, 1, d_{m+1}, t) - \max_{x_{m-1,2}, d_{m+1}} f(x_{m-1,2}, -1, d_{m+1}, t)\right\} \quad (9)$$

The timing correction can be obtained as $$\hat{t} = \arg\max_{t=-1,0,+1}\{|\lambda(d_m, t)|\} \quad (10)$$

then the unconditional LLR for time index $\hat{t}$ for information data is $\lambda(d_m) \triangleq \lambda(d_m, \hat{t})$. As can readily be appreciated, time synchronization may be less precise and a greater number of conditional LLRs are calculated in determining the timing correction.

The $|\Sigma_{k,i} y_{k,i} p_{k,i}|$ can be used as an estimate for amplitude A. The 3-bit (3 symbol) window can then be slid by one bit (symbol) duration and the process repeated to correct timing and obtain the LLR for the next bit (symbol).

Combining LLRs

LLRs determined using processes similar to those outlined above can be combined at the output of detectors for n receivers as $$\lambda(d_m) = \Sigma_{i=1}^n \lambda_i(d_m) \quad (11)$$

The final decision on information data $d_m$ is $$\hat{d}_m = \text{sign}(\lambda(d_m)) \quad (12)$$

As noted above, reliability thresholds can be applied to the soft metrics determined by each receiver and soft metrics that indicate low reliability can be excluded from the final decision. In many embodiments, the final decision is based on the soft metric or soft metrics that indicate the highest reliability.

Hardware Implementations of 3-Bit FMO Multiple Symbol Noncoherent Soft Output Detectors RFID receivers that implement 3-bit multiple symbol detectors that perform hard decision detection are described in U.S. Pat. No. 7,633,377 (incorporated by reference above). In U.S. Pat. No. 7,633,377, the metric shown in FIG. 15*d* and equation (41) is formulated based on the property of FMO modulation that $x_{m,2} = d_m x_{m-1,2}$, $x_{m,1} = -x_{m-1,2}$ as follows (utilizing the notation presented above)

$$|(r_{m-1,2} - r_{m,1})d_m + (r_{m,2} - r_{m+1,1}) + (r_{m+1,2} - r_{m+2,1})d_{m-1}| \quad (13)$$

When the same metric is formulated based on the property of FMO modulation that $x_{m,2} = d_m x_{m-1,2}$, $x_{m+1,2} = d_{m+1} d_m x_{m-1,2}$, the following equivalent metric is obtained $$|(r_{m-1,2} - r_{m,1}) + (r_{m,2} - r_{m+1,1})d_m + (r_{m+1,2} - r_{m+2,1}) d_m d_{m+1}| \quad (14)$$

or equivalently $$g(d_m, d_{m+1}) = |(r_{m-1,2} - r_{m,1}) + (r_{m,2} - r_{m+1,1})d_m + (r_{m+1,2} - r_{m+2,1})d_m d_{m+1}|^2 \quad (15)$$

A hard decision can be performed to determine $d_m$ as $$\hat{d}_m = \arg\max_{d_m, d_{m+1}} g(d_m, d_{m+1}) \quad (16)$$

When accounting for timing correction, this becomes $$g(d_m, d_{m+1}, t) = |[(r_{m-1,2} - r_{m,1}) + (r_{m,2} - r_{m+1,1})d_m + (r_{m+1,2} - r_{m+2,1})d_m d_{m+1}]|^2 \quad (17)$$

where t is for timing correction.

A hard decision can be performed to detect $d_m$ as $$\hat{d}_m = \arg\max_{t=-1,0,+1} \max_{d_m, d_{m+1}} g(d_m, d_{m+1}, t) \quad (18)$$

However the above $g(d_m, d_{m+1}, t)$ is equivalent to $$g(d_m, d_{m+1}, t) = |[(r_{m-1,2} - r_{m,1})d_m + (r_{m,2} - r_{m+1,1}) + (r_{m+1,2} - r_{m+2,1})d_{m+1}]|^2 \quad (19)$$

or from the point of data decision and timing is also equivalent to $$g(d_m, d_{m+1}, t) = |(r_{m-1,2} - r_{m,1}) + (r_{m,2} - r_{m+1,1})d_m + (r_{m+1,2} - r_{m+2,1})d_m d_{m+1}| \quad (20)$$

Accordingly, a multiple symbol noncoherent soft output detector can be implemented with minor modification to the detector disclosed U.S. Pat. No. 7,633,377 by using the correlations that were generated prior to the hard decision to generate the soft output as follows:

$$\lambda(d_m, t) = \frac{A}{\sigma^2}\{\max_{d_{m+1}} g'(1, d_{m+1}, t) - \max_{d_{m+1}} g'(-1, d_{m+1}, t)\} \quad (21)$$

where $g'(d_m, d_{m+1}, t) = |(r_{m-1,2} - r_{m,1}) + (r_{m,2} - r_{m+1,1})d_m + (r_{m+1,2} - r_{m+2,1})d_m d_{m+1}|$ Alternatively, we can compute $$\lambda(d_{m+1}, t) = \frac{A}{\sigma^2}\left\{\max_{d_m} g'(d_m, +1, t) - \max_{d_m} g'(d_m, -1, t)\right\} \quad (21a)$$

where the maximum is taken over $d_m = +1$ and $d_m = -1$.

However, an approximation can be used if power computation is easier than complex absolute value calculation as $$\lambda(d_m, t) = \quad (22)$$

$$\frac{A}{\sigma^2}\{\max_{d_{m+1}} g(1, d_{m+1}, t) - \max_{d_{m+1}} g(-1, d_{m+1}, t)\} \text{ where}$$

$$g(d_m, d_{m+1}, t) =$$

$$|(r_{m-1,2} - r_{m,1}) + (r_{m,2} - r_{m+1,1})d_m + (r_{m+1,2} - r_{m+2,1})d_m d_{m+1}|^2$$

$$A = \left|\sum_{k,i} y_{k,i} p_{k,i}\right|$$

which comes from preamble synchronization circuits. If complex absolute value computation cannot be done, $A^2$ can be used as an approximation.

Figure 3:
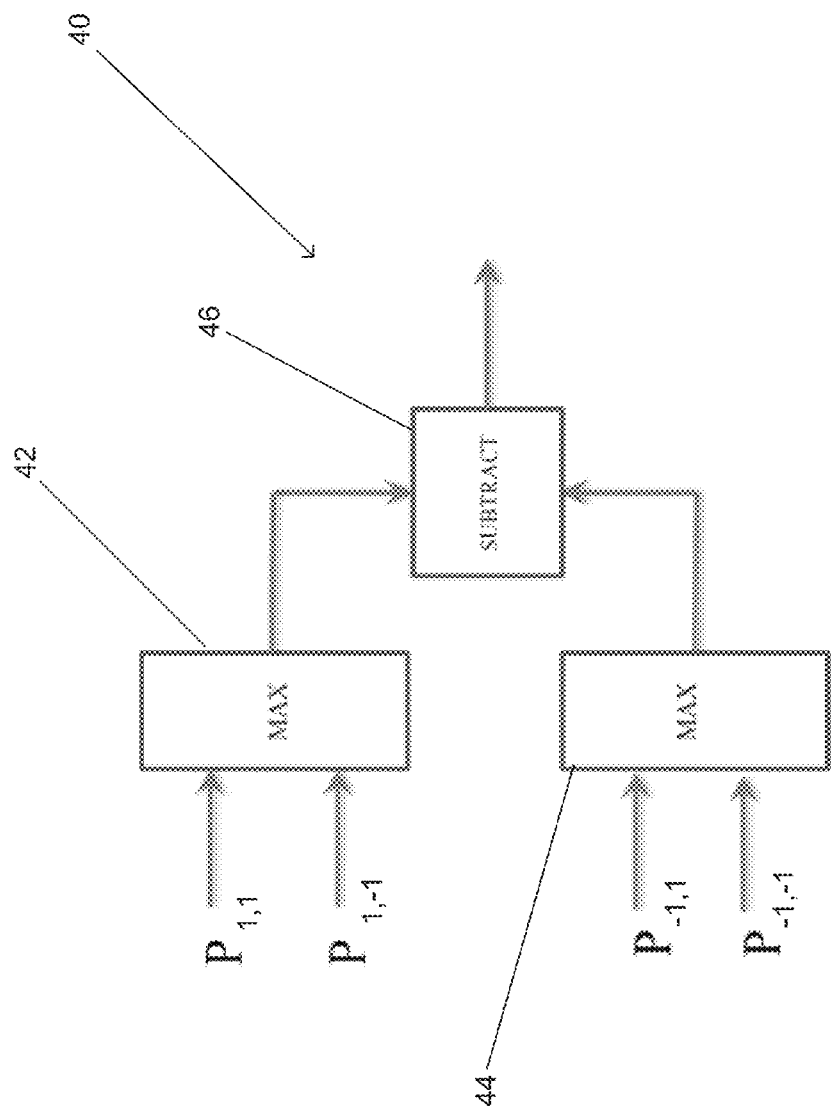
FIG. 3 illustrates the manner in which a hard decision FM0 3-bit multiple symbol noncoherent soft output detector can be modified to generate soft metrics.

Based upon the above discussion, the hardware implementation of the detector disclosed in U.S. Pat. No. 7,633,377 can be modified by replacing the maximum operation in the hardware implementation of the hard detection decision $$\left(\text{i.e. } \max_{d_m, d_{m+1}} g(d_m, d_{m+1}, t)\right)$$

with two maximum operation blocks that are subtracted (i.e. $\max_{d_{m+1}} g(1, d_{m+1}, t) - \max_{d_{m+1}} g(-1, d_{m+1}, t)$). The modification to the detector disclosed in U.S. Pat. No. 7,633,377 to achieve a multiple symbol noncoherent soft output detector in accordance with embodiments of the invention is illustrated in FIG. 3. The power computation $g(d_m, d_{m+1}, t)$ is represented as $P_{d_m,d_{m+1}}$. The maximum value of $P_{1,1}$ and $P_{1,-1}$ is determined using a first maximum block 42 and the maximum value of $P_{-1,1}$ and $P_{-1,-1}$ is determined using a second maximum block 44. The two maximums are then subtracted using a subtraction block 46 to generate a value proportional to the LLR $\lambda(d_m, t)$. The result of the subtraction can be weighted by A or $A^2$ to produce a soft metric based on the LLR. Obtaining soft metrics using the above hardware implementation does not alter the timing correction scheme utilized by the hardware detector.

For symbol stream combining, the timing of the soft metrics from two or more receivers should be aligned. In instances where the receivers are in close vicinity of each other and data rates are low, such additional timing alignment is not as important. When combining soft outputs from multiple receivers, the noise variances for identical RF front ends for two or more receivers with the same Noise Figure (NF) are almost the same. Therefore, $\sigma^2$ need not be calculated for each receiver. If this is not the case, then for each receiver in addition to received amplitude (or power) computation the received noise variance $\sigma^2$ is calculated prior to combining.

Although a specific hardware implementation is discussed above based upon modifying the RFID receiver disclosed in U.S. Pat. No. 7,633,377, any of a variety of receiver designs can be utilized to implement multiple symbol noncoherent soft output detectors that produce soft outputs in accordance with embodiments of the invention. Additional functionality including (but not limited to) collision detection that can be supported by a receiver configured to produce soft metrics in accordance with embodiments of the invention are discussed further below.

Collision Detection

The soft metrics generated by a multiple symbol noncoherent soft output detector in accordance with an embodiment of the invention can be utilized to perform collision detection. When a population of RFID tags responds to a transmission, such as an interrogation signal, a collision can occur when a receiver system receives responses from multiple tags.

Figure 4A:
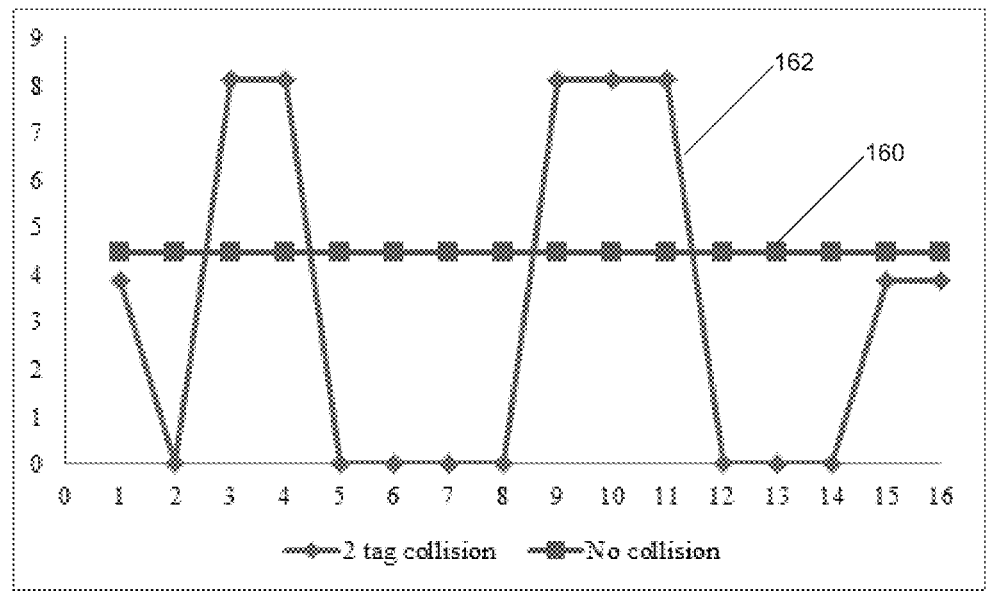
FIGS. 4A and 4B illustrate sample functions of LLRs over a sequence of 16 symbols for the cases of no collision and a two tag collision.
Figure 4B:
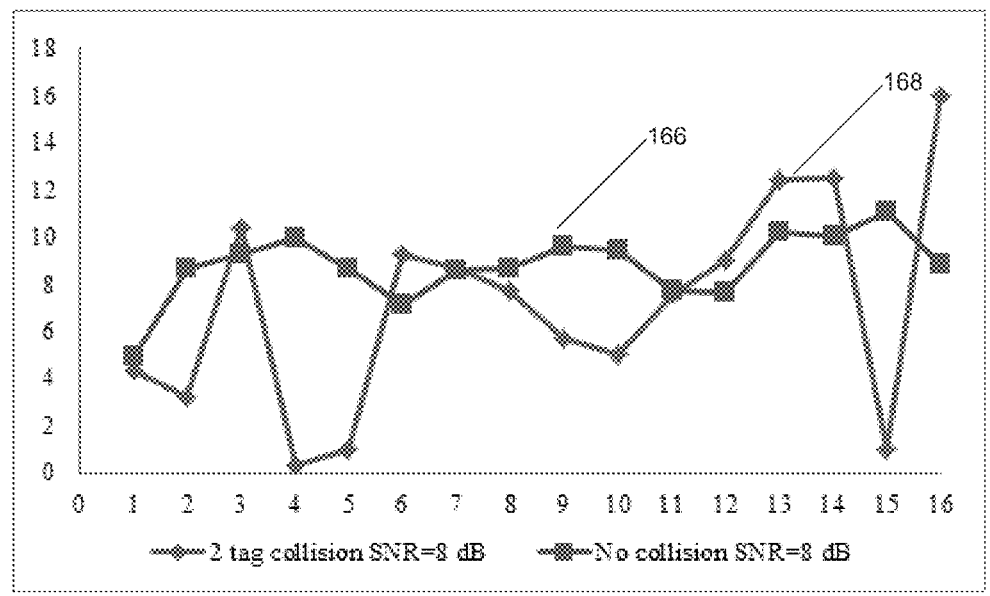

Sample functions of LLRs over a sequence of 16 symbols when there is no collision and when there is a two tag collision are illustrated in FIGS. 4A and 4B. In FIG. 4A, sample functions of 16 LLRs with a very high SNR are shown. As can be seen in the figure, in the case of no collision represented by curve 160, the LLRs are at nearly a constant value. In the case of a two tag collision represented by curve 162, some LLRs are nearly double the value of the LLRs in curve 160 (resulting from symbols being summed) and some LLRs are nearly zero (resulting from symbols cancelling out). In FIG. 4B, sample functions of 16 LLRs with a SNR of 8 dB are shown. As a result of interference and/or noise, the LLRs have more diverse values than in the case of high SNR in FIG. 4A. In the case of no collision represented by curve 166, the LLRs are close to a mean value. In the case of a two tag collision represented by curve 168, the LLRs have more divergent values (resulting from symbols being summed and cancelling out).

Figure 5:
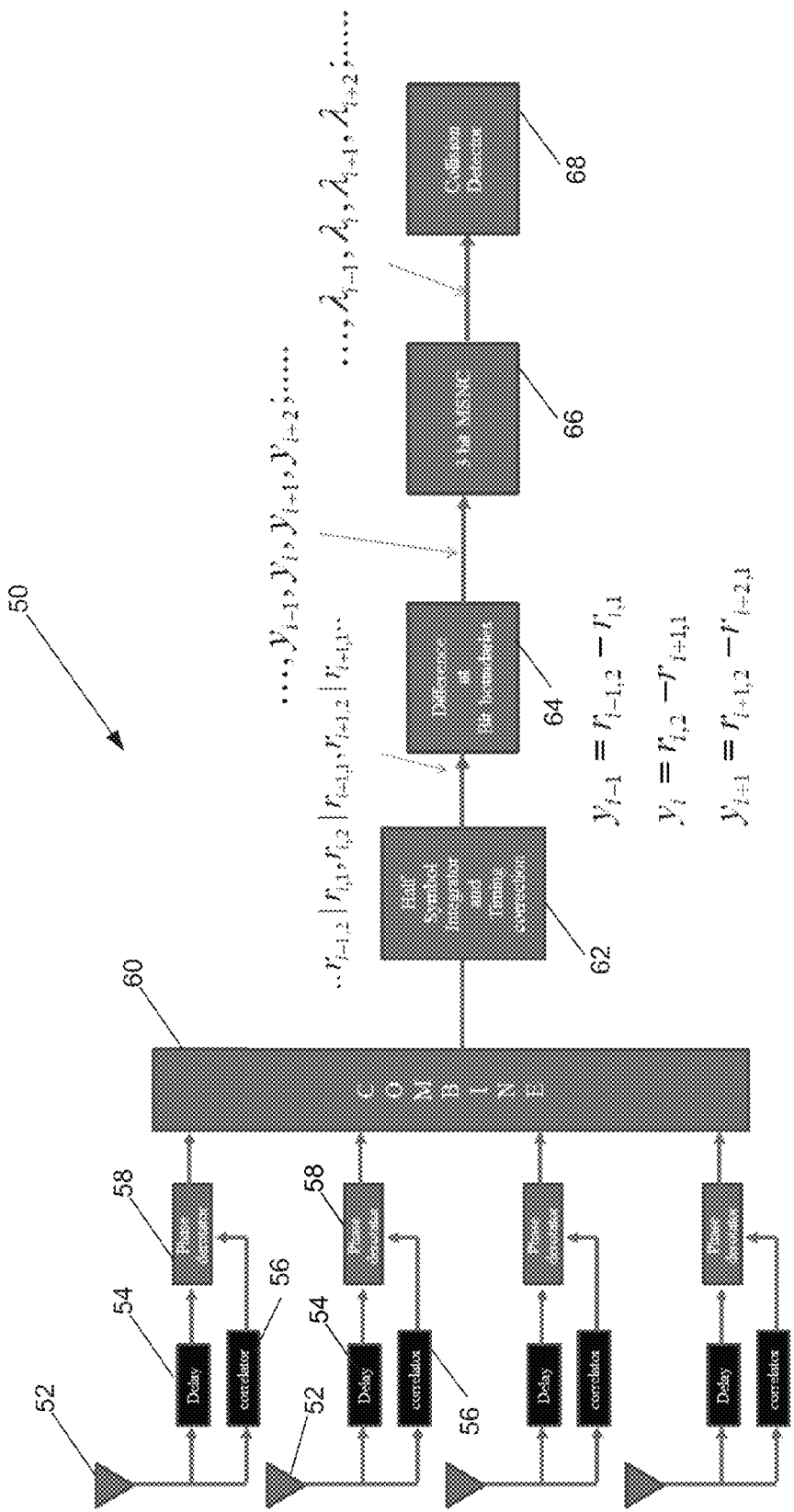
FIG. 5 conceptually illustrates an RFID receiver system that that can perform collision detection in accordance with embodiments of the invention.

In many embodiments of the invention, an RFID receiver system that can be used for collision detection includes a half symbol integrator, multiple symbol noncoherent detector, and collision detector. An RFID receiver system that performs collision detection in accordance with embodiments of the invention is illustrated in FIG. 5. The receiver system 50 includes a phased antenna array with antennas 52. Each antenna 52 directs a signal to a delay 54 and correlator 56. The delay 54 and correlator 56 feed into a phase derotator 58. A combiner 60 receives the output of the phase derotators 58 and provides a signal to a half symbol integrator 62. A difference block 64 calculates the differences at bit boundaries (i.e., between a second one-half symbol and the subsequent first one-half symbol) and provides the information to a three bit multiple symbol noncoherent detector 66. The noncoherent detector 66 calculates LLRs from the half-symbol differences and provides the information to a collision detector 68. Systems and methods for detecting collisions utilizing LLRs are discussed below.

Referring again to the example of FMO modulated data transmitted by RFID tags in accordance with the EPC Gen 2 standard, RFID collision detection can be performed using the soft metrics generated when detecting an RFID tag's RN16 query response. The RN16 query response is a 16 bit random number that is assigned to each tag. As is discussed further below, a collision during the transmission of the RN16 bits can be detected using the soft metrics based on LLRs of the bits detected by a multiple symbol noncoherent soft output detector in accordance with embodiments of the invention. LRRs can be computed from short sequences of symbols within the RN16 transmission (e.g. two or three symbols).

Assuming that the preamble is already detected, the LLR based on observed 3-bit (symbol) duration utilized for performing collision detection is as follows:

$$\lambda_i = \max_d |(r_{i-1,2} - r_{i,1}) + (r_{i,2} - r_{i+1,1}) + (r_{i+1,2} - r_{i+2,1})d| - \max_d |(r_{i-1,2} - r_{i,1}) - (r_{i,2} - r_{i+1,1}) - (r_{i+1,2} - r_{i+2,1})d| \quad (23)$$

This LLR can be computed for $i=1, 2, 3, \ldots, 15$ and $d=+1$ and $-1$ (where the maximum is taken over $d=+1$ and $d=-1$). For simplicity 6 is dropped in (23). On the edges of RN16, $r_{0,2}$ is known from the last one-half symbol observation from the preamble sequence. For $r_{17,1}$ if it is not available we can set $r_{17,1} = -r_{16,2}$. The method is based on observing $|\lambda_i|$ for $i=1, 2, 3, \ldots, 15$.

Note that we can also compute $\lambda_{i+1}$ based on the same observations as:

$$\lambda_{i+1} = \max_d |(r_{i-1,2} - r_{i,1}) + (r_{i,2} - r_{i+1,1})d + (r_{i+1,2} - r_{i+2,1})d| - \max_d |(r_{i-1,2} - r_{i,1}) - (r_{i,2} - r_{i+1,1})d - (r_{i+1,2} - r_{i+2,1})d| \quad (23a)$$

In particular this can be used (for $i=15$) to compute $\lambda_{16}$ (for the last bit in RN16) if it is desired. However, for collision detection we use LLR for 15 bits but one can also use 16 bits. If such as follows we need only to do averaging over 16 bits rather 15 and use magnitude of 16 LLRs.

When there is no collision the one-half symbol observations are:

$$r_{i,j} = A_1 x_{i,j} e^{j\phi_1} + n_{i,j} \quad (24)$$

For $i=0, 1, 2, \ldots, 16$ and $j=1, 2$.

When there is a two tag collision the one-half symbol observations are:

$$r_{i,j} = A_1 x_{i,j} e^{j\phi_1} + A_2 x'_{i,j} e^{j\phi_2} + n_{i,j} \quad (25)$$

For $i=0, 1, 2, \ldots, 16$ and $j=1, 2$. All phases are unknown and uniformly distributed. As discussed further above, one-half symbols can be obtained at the output of a one-half symbol integrator by summing the number of samples per one-half symbol taken with a matched filter and correcting for timing as in equation (10).

One method to discriminate collision versus no collision is to use variance of LLR over the 15-bit (symbol) received RN16 transmission as a decision metric. The variance can be defined as:

$$\text{Var} = \frac{1}{15}\sum_{i=1}^{15}|\lambda_i|^2 - \left(\frac{1}{15}\sum_{i=1}^{15}|\lambda_i|\right)^2 \quad (26)$$

The variance can be compared to a threshold to detect collisions. In several embodiments, a threshold TH=m|corr| is utilized, where "corr" represents the result of preamble correlation normalized by the number of one half symbols used in the preamble, and m is a number that can be set based on a desired false detection probability appropriate to a specific application. Based on the above, the magnitude of "corr" can be expressed as $$|\text{corr}| = \frac{1}{2N_p}|\Sigma_{k,i} y_{k,i} p_{k,i}| \quad (27)$$

If Var>TH then a collision is declared.

Figure 6A:
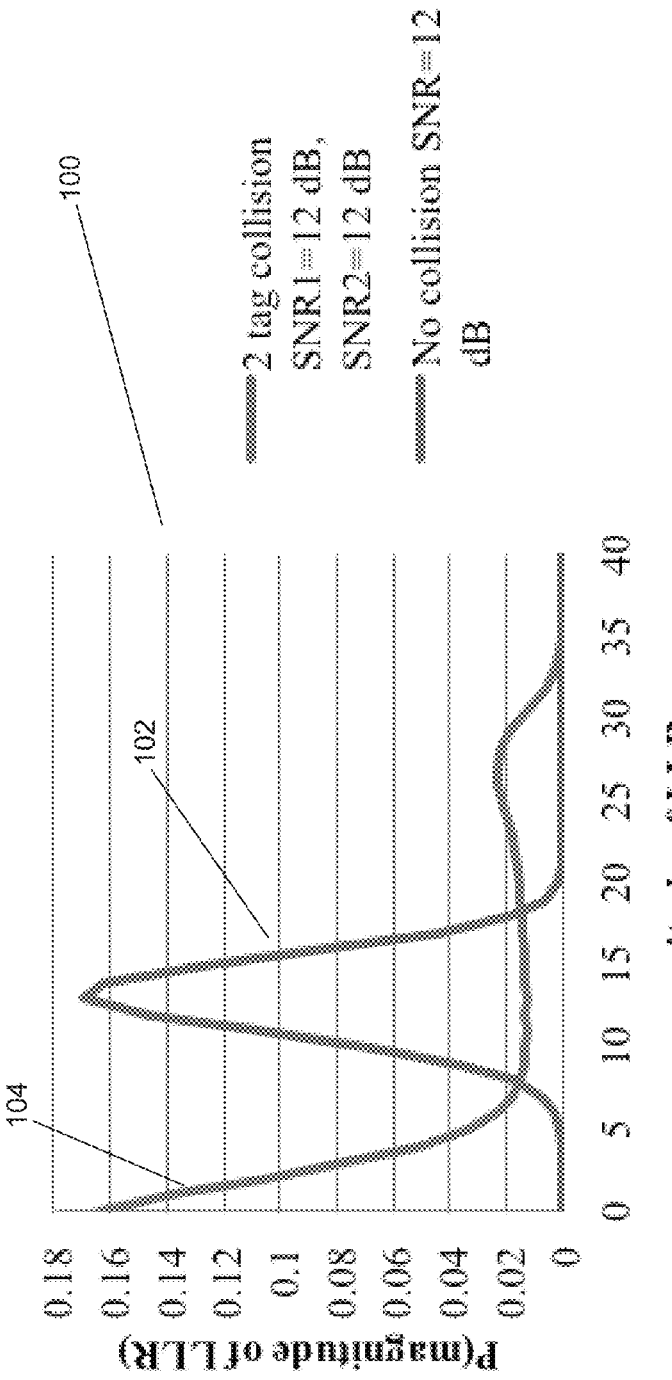
FIGS. 6A and 6B are histograms illustrating LLR simulations for the cases of no collision and a two tag collision using LLRs over three symbol sequences.

A histogram of LLR simulations for two cases of no collision and two tag collision where the received SNR of each tag is the same is illustrated in FIG. 6A. The histogram 100 illustrates a curve 102 of the probability that the magnitude of an LLR is a certain value plotted against possible values for the magnitude of an LLR when there is no collision and the RFID tag has a Signal to Noise Ratio (SNR) of 12 dB. A curve 104 shows the probability that the magnitude of an LLR is a certain value plotted against possible values for the magnitude of an LLR when there is a two tag collision where each tag has a SNR of 12 dB. As can be seen in the chart, the curve 102 for no collision lies mostly between 5 and 20 and peaks sharply near a mean value. Meanwhile, the curve 104 for collision drops from a high sharply between 0 and 5 and remains low from 5 to 30.

Figure 6B:
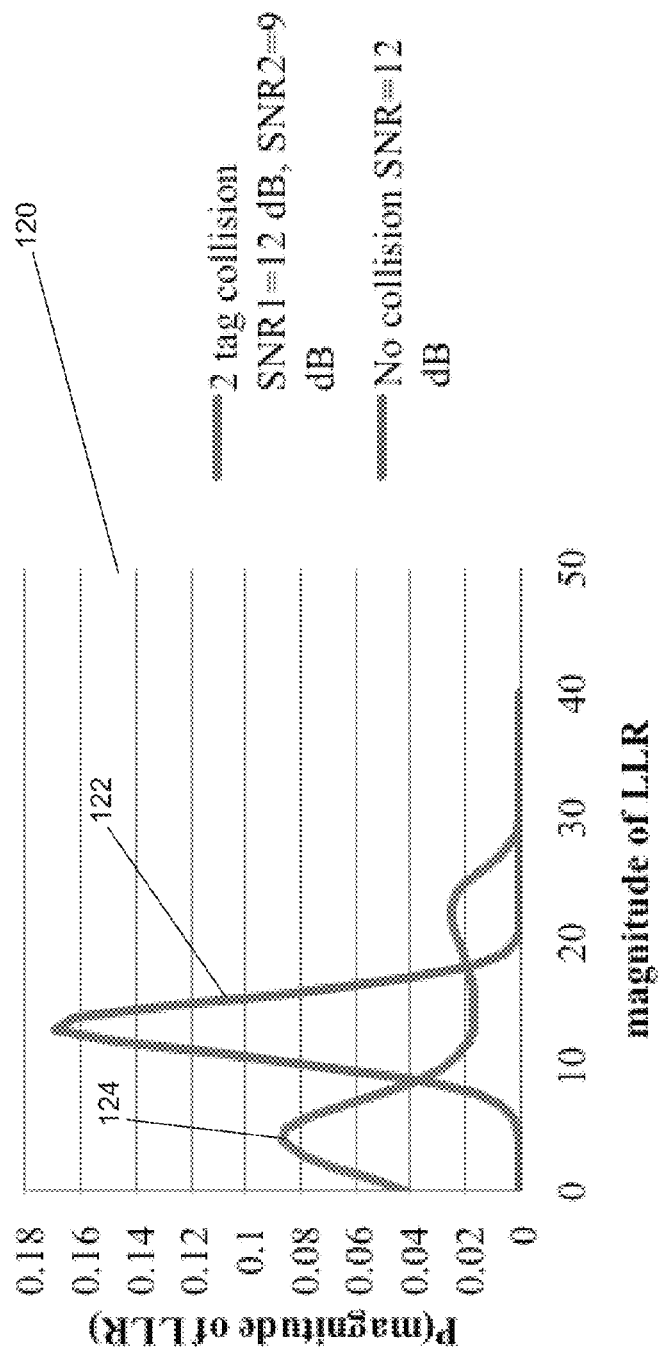

Similarly, a histogram of LLR simulations for two cases of no collision and a two tag collision where the received SNR of the first tag is 12 dB and the received SNR of the second tag is 9 dB is illustrated in FIG. 6B. Similar to FIG. 6A, the curve 122 for no collision lies mostly between 5 and 20 and peaks sharply near a mean value. The curve 124 for collision has a smaller peak near 5 and remains low from 10 to 25. From the stark differences in the shape of these curves for the case of collision versus the case of no collision, it can be seen that the variance as computed in equation (26) and other techniques for describing the shape of a distribution that are discussed further below (e.g., using central moment about the mean) can be used to distinguishes between the two cases. For example, variance measures the spread of a distribution. In FIGS. 6A and 6B it can be seen that the curves in the case of no collision are more narrow than the curves in the case of collision, and therefore the variance will be smaller. Using variance as in equation (26) and a threshold TH=m|corr| using equation (27), an m can be chosen to give a threshold TH that can distinguish between the variance of a curve where there is no collision and the variance of a curve where there is a collision.

Figure 7A:
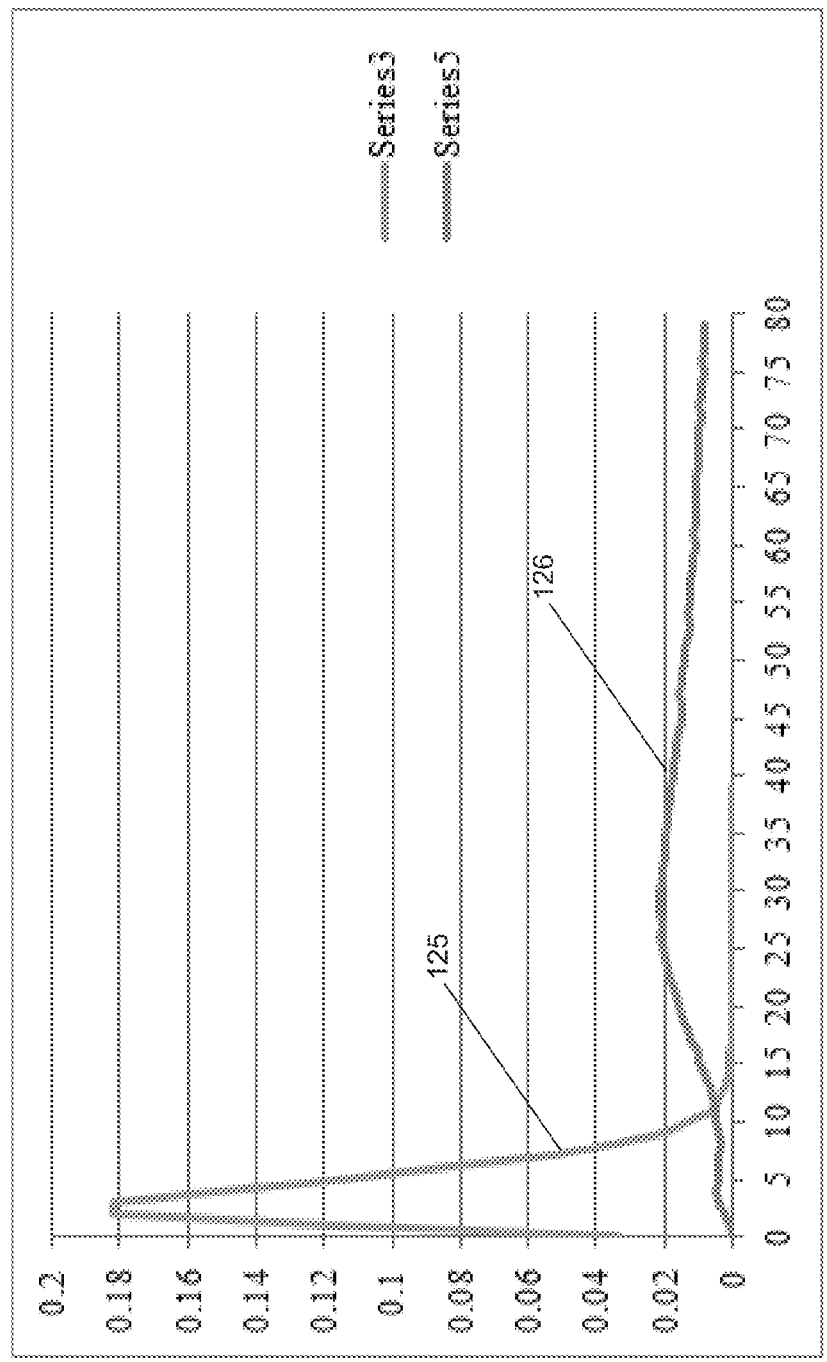
FIGS. 7A and 7B are histograms illustrating simulations of the variance Var for the cases of no collision and two tag collision using LLRs over three symbol sequences.
Figure 7B:
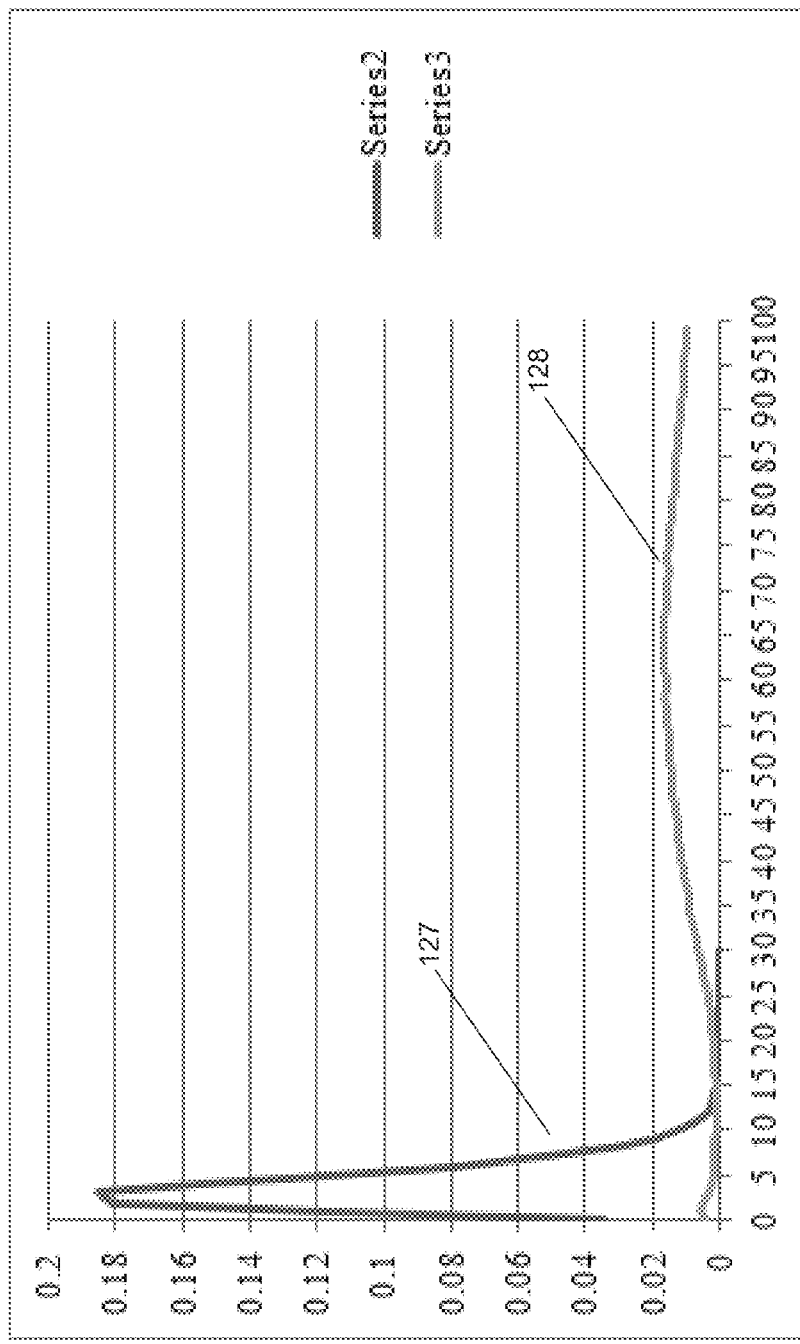

Histograms of the variance Var for the cases of no collision and two tag collision are illustrated in FIGS. 7A and 7B. In FIG. 7A one tag has an SNR of 12 dB while the other tag has an SNR of 9 dB. In FIG. 7B the two tags each have an SNR of 12 dB. As can be seen in the figures, the curves for the case of no collision (125 in FIG. 7A and 127 in FIG. 7B) concentrate and peak around different values from the curves for the case of a collision (126 in FIG. 7A and 128 in FIG. 7B). Particularly where the SNR is higher (9 and 12 dB) there is very little overlap in the curves of Var. Accordingly, a threshold TH can be determined using the equations described above for effectively distinguishing between collision and no collision.

Figure 8A:
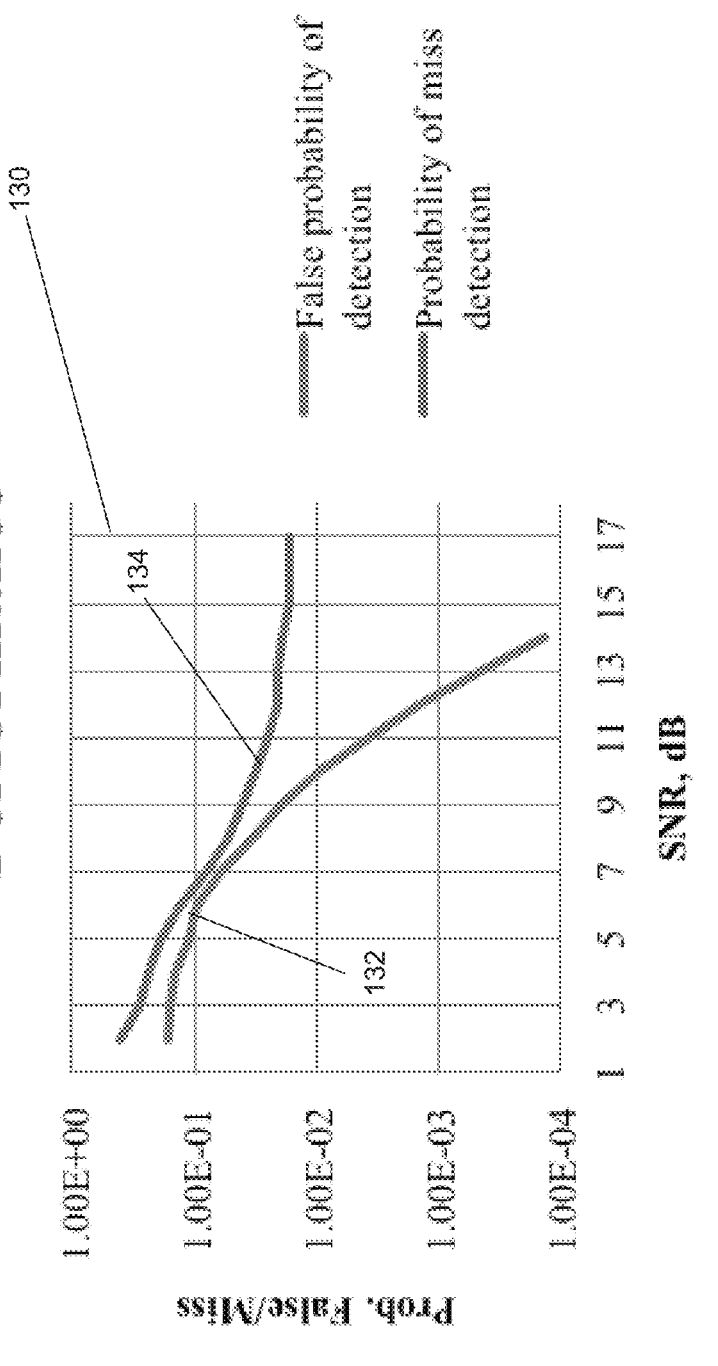
FIGS. 8A and 8B are charts illustrating the simulated probability of false detection and the probability of miss detection for the cases of no collision and a two tag collision using LLR over three symbol sequences and the variance of LLR as a decision metric for the cases.
Figure 8B:
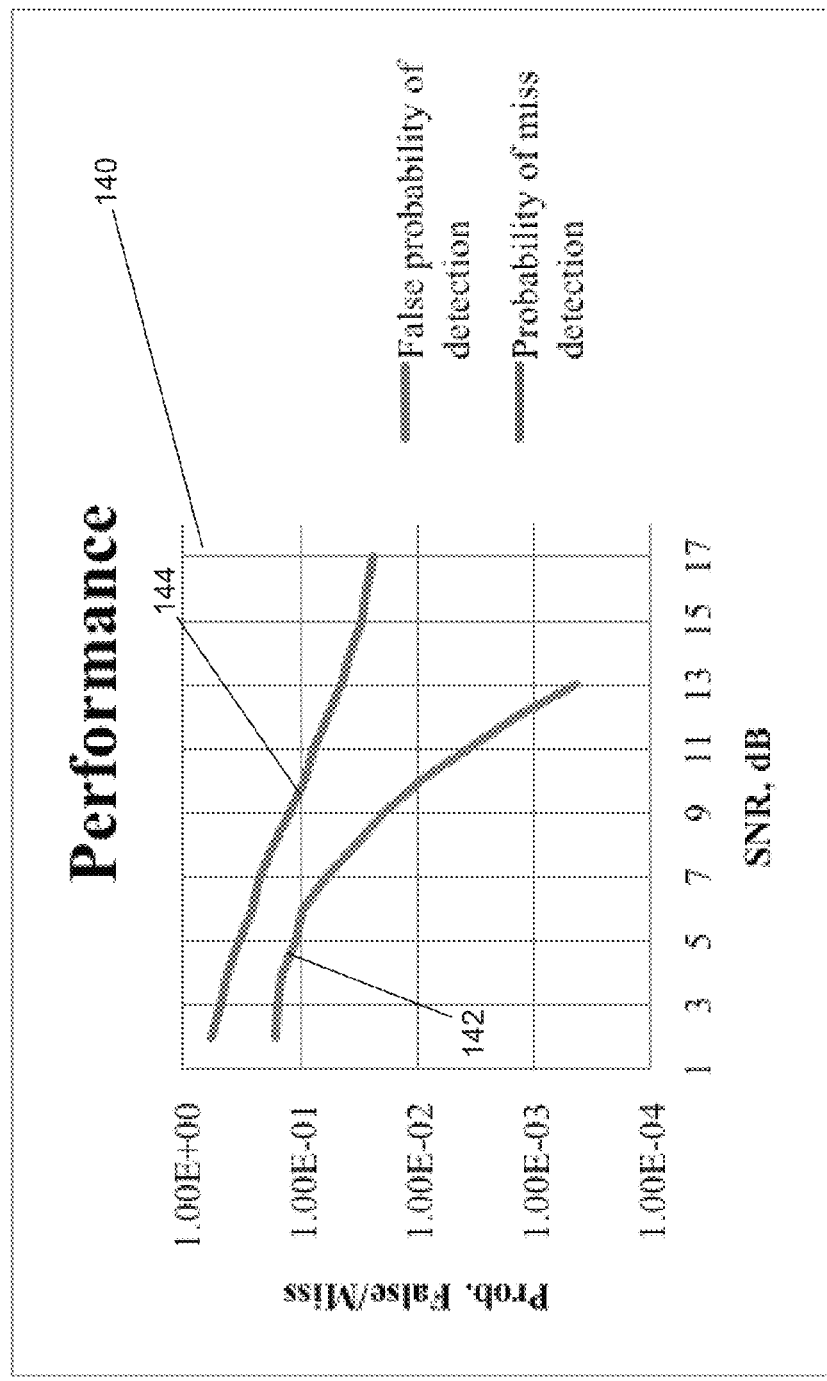

A simulation of the probability of a false detection and the probability of a miss detection using LLR as in equation (23) the variance of LLR as in equation (26) as a decision metric when the colliding tags have the same SNR is illustrated in FIG. 8A. As can be seen from the chart 130, both the probability of false detection 132 and the probability of miss detection decrease with increased SNR. The probability of false detection 132 trails off considerably relative to the probability of miss detection 134 with increased SNR due to the effectiveness of the threshold in identifying two tag collisions. Therefore, the probability of miss detection does not diminish as steeply with increased SNR. FIG. 8B is a similar chart to FIG. 8A with the exception that the simulation involves a two tag collision, where the SNR of the signal received from the first tag is 3dB greater than the signal received from the second tag. As can be seen from the chart 140, the probability of false detection 142 and the probability of miss detection 144 exhibit similar characteristics even when the signal of one tag dominates. Accordingly, the simulations indicate that the stronger the received signal the more likely that the LLR magnitude output by the multiple symbol noncoherent soft output detector can be utilized to accurately detect collisions.

Other methods of collision detection involve using the mean (first moment) of the magnitude of LLR over the 15-bit (symbol) received RN16 transmission. One example is taking the ratio of the second moment of LLR over the 15-bit received RN16 over the square of the first moment of LLR over the 15-bit received RN16. This decision metric DM2 can be defined as:

$$DM2 = \left(\frac{1}{15}\sum_{i=1}^{15}|\lambda_i|^2\right)\bigg/\left(\frac{1}{15}\sum_{i=1}^{15}|\lambda_i|\right)^2 \quad (28)$$

Normalizing in this way helps to keep the threshold constant over a wide range of signal to noise ratios. The metric DM2 can be compared to a threshold that is set to a number. In the case of no collision, the metric DM2 is nearly one for a range of signal to noise ratios in which RFID receivers operate. In the case of a collision, the metric DM2 is strictly greater than one.

Further methods of collision detection can use the ratio of higher moments of LLR over the 15-bit received RN over powers of the first moment of LLR over the 15-bit received RN16. One further method utilizes the normalized m-th central moment of the LLRs as a decision metric DMm as follows:

$$DMm = \frac{\frac{1}{15}\sum_{i=1}^{15}\left(|\lambda_i| - \frac{1}{15}\sum_{i=1}^{15}|\lambda_i|\right)^m}{\left(\frac{1}{15}\sum_{i=1}^{15}|\lambda_i|\right)^m} + \text{constant} \quad (29)$$

For example the decision metric DM4 using the fourth central moment can be defined as:

$$DM4 = \frac{\frac{1}{15}\sum_{i=1}^{15}\left(|\lambda_i| - \frac{1}{15}\sum_{i=1}^{15}|\lambda_i|\right)^4}{\left(\frac{1}{15}\sum_{i=1}^{15}|\lambda_i|\right)^4} + \text{constant} \qquad (30)$$

The metric DM4 can be compared to a threshold that is set to a number. The constant can be set to any number that simplifies the selection of the threshold. In the case of no collision, the metric DM4 is almost a constant number (the constant). In the case of collision, the metric DM4 will be strictly greater than the constant. For example, if the constant is 3, then the metric DM4 will be close to 3 when there is no collision and will be strictly greater than 3 when there is a collision.

Figure 9A:
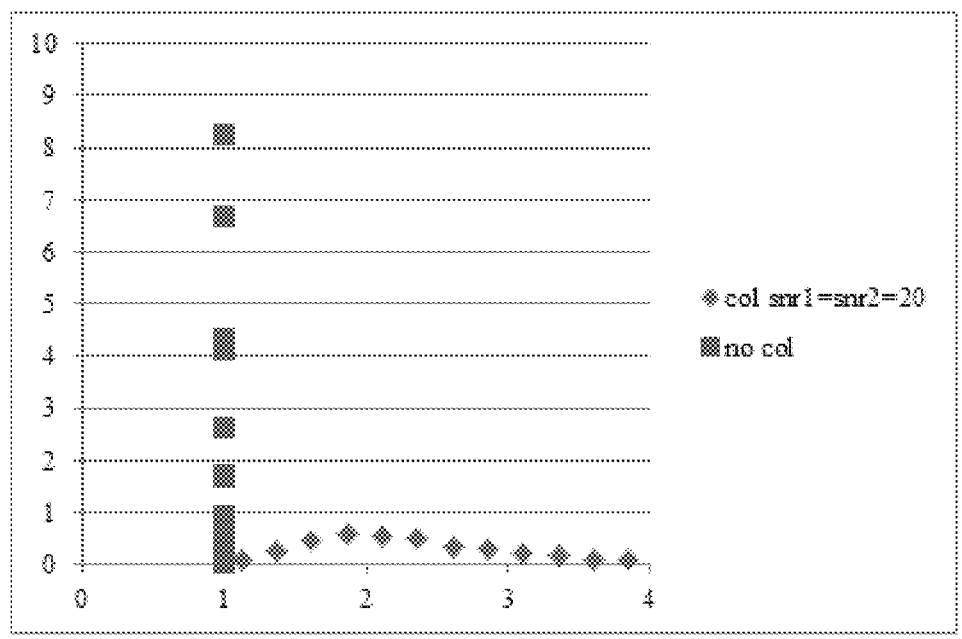
FIGS. 9A-9D are normalized histograms illustrating simulations using the DM2 metric for two cases of no collision and two tag collision with various SNR.
Figure 9B:
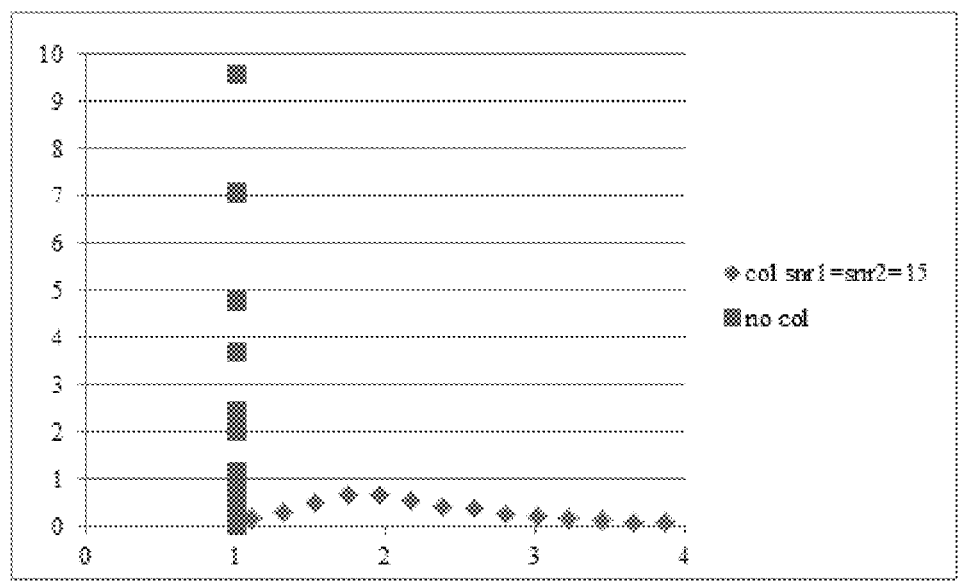
Figure 9C:
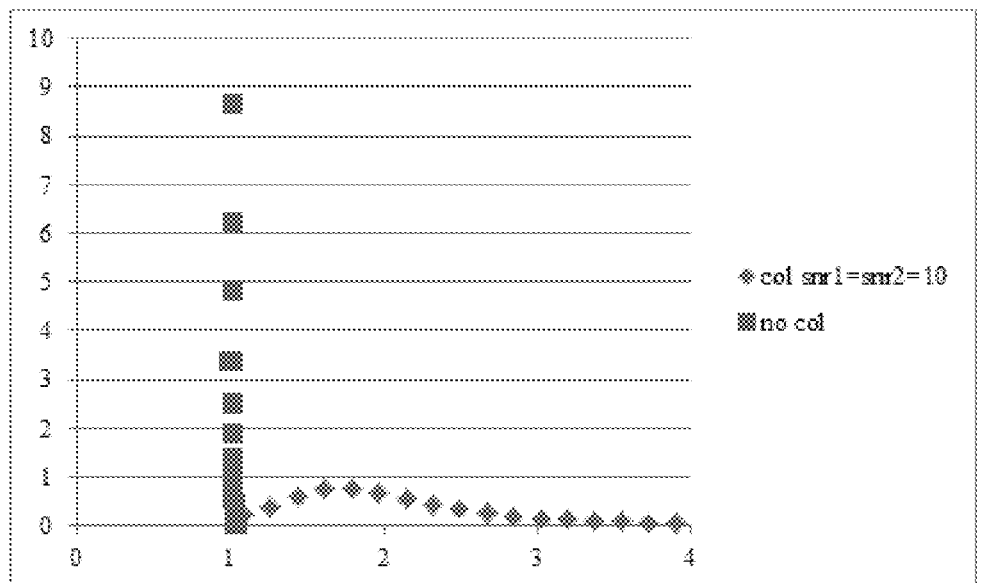
Figure 9D:
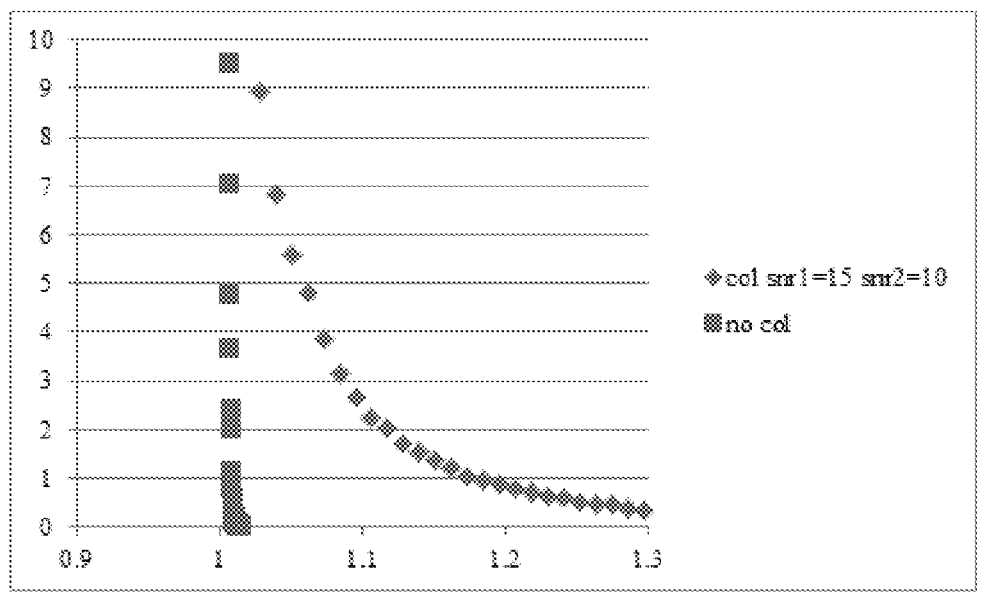

Normalized histograms of simulations using the DM2 metric for two cases of no collision and two tag collision with various SNR are illustrated in FIGS. 9A-9D. In each chart, the plot of col shows cases where there is a two tag collision and the plot of no col shows cases where there is no collision. In FIG. 9A the two RFID tags each have an SNR of 20 dB, in FIG. 9B the two tags each have an SNR of 15 dB, in FIG. 9C the two tags each have an SNR of 10, and in FIG. 9D one tag has an SNR of 15 and the other tag has an SNR of 10. As can be seen in the charts, DM2 typically remains very close to 1 in the case of no collisions for various SNR and can vary from close to 1 to close to 4 in the case of collisions. Furthermore, there is almost no overlap between the histogram of DM2 when there is no collision and the histogram of DM2 when there is a two tag collision. Accordingly, the simulations indicate that one way to determine a threshold for the DM2 metric is to use experimentation or observation to choose a threshold to distinguish between the two situations of collision versus no collision.

Figure 10A:
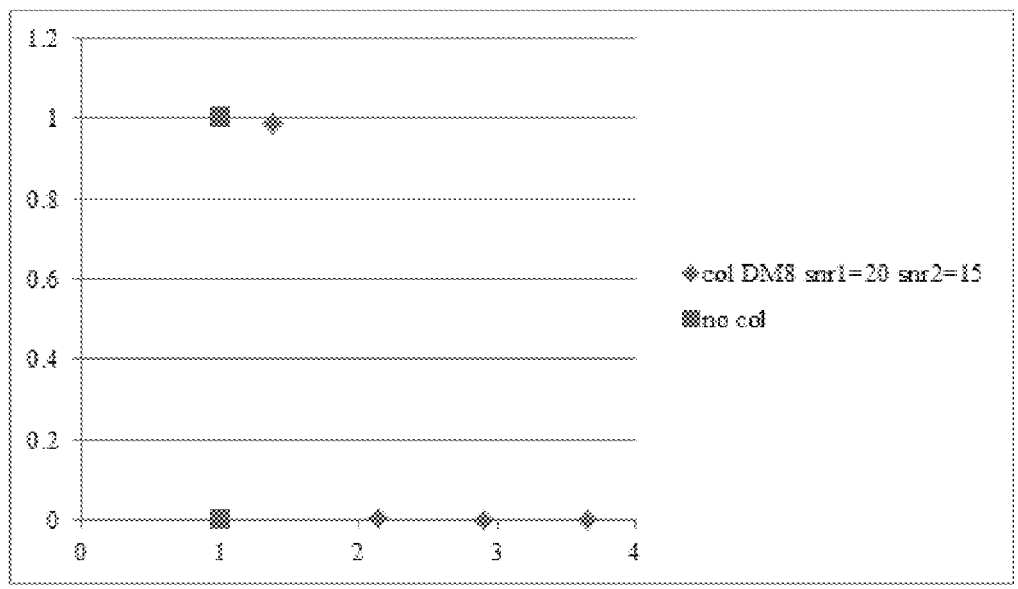
FIGS. 10A-10E are normalized histograms of illustrating simulations using the DM8 metric for two cases of no collision and two tag collision with various SNR.
Figure 10B:
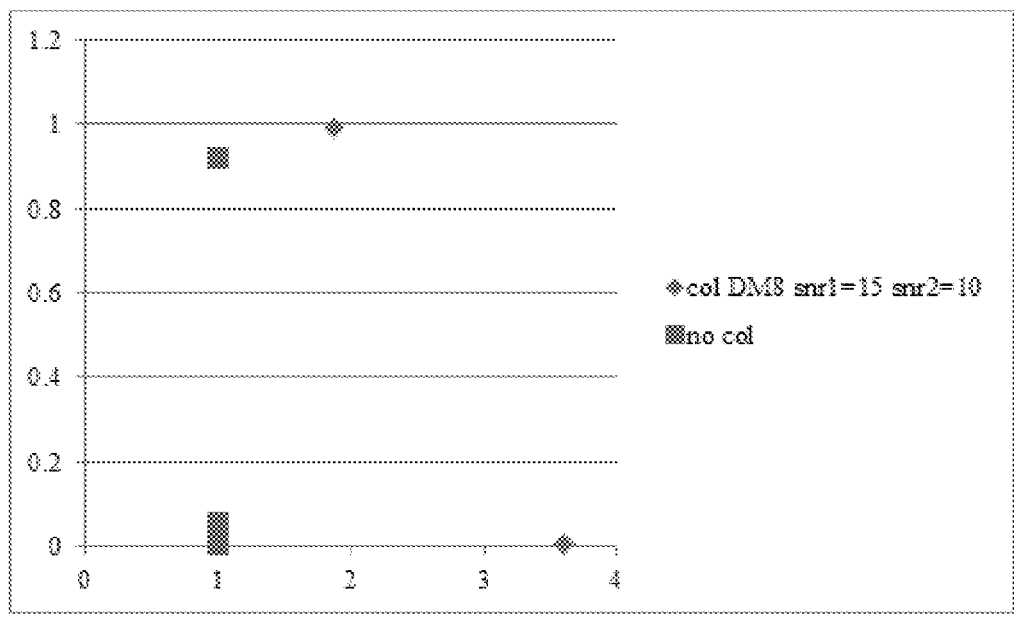
Figure 10C:
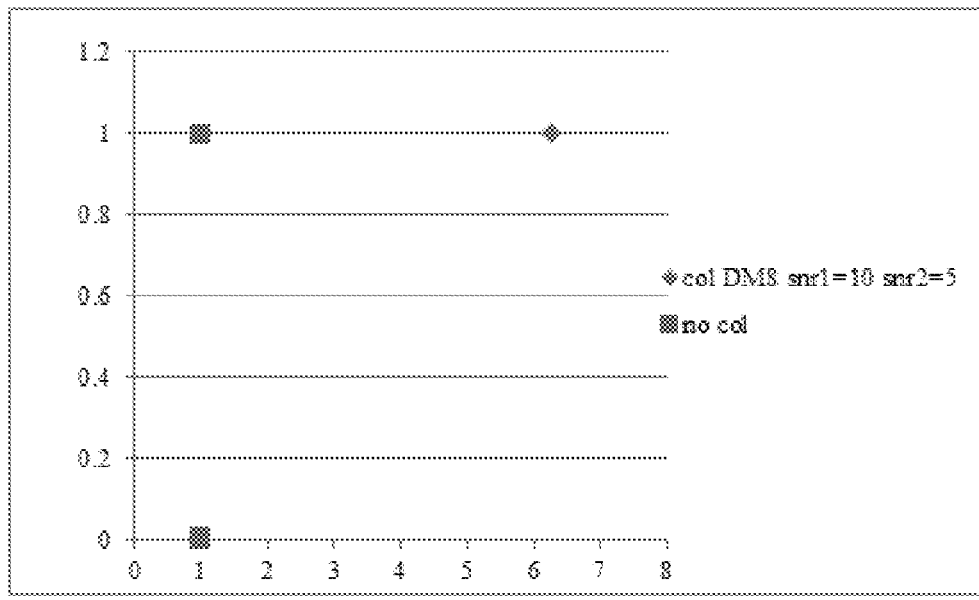
Figure 10D:
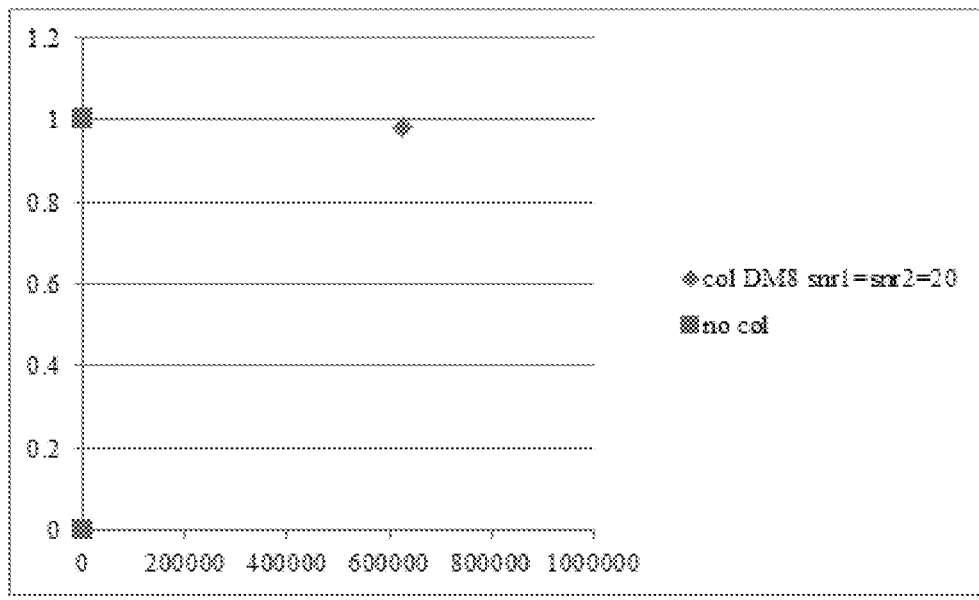
Figure 10E:
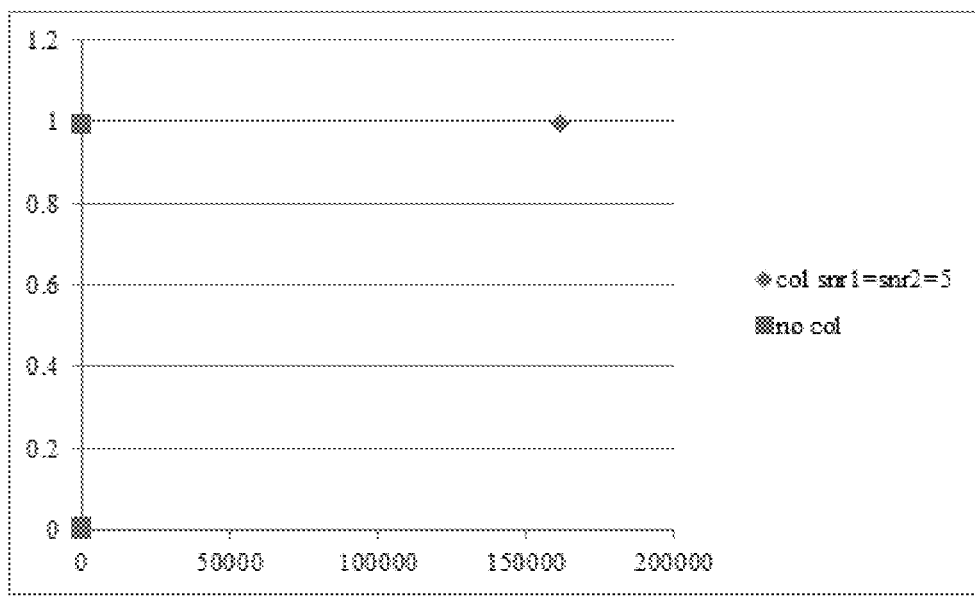

Using equation 29, a decision metric DM8 can be formed by using m=8. Normalized histograms of simulations using the DM8 metric for two cases of no collision and two tag collision with various SNR are illustrated in FIGS. 10A-E. In each chart, the plot of col shows cases where there is a two tag collision and the plot of no col shows cases where there is no collision. In FIG. 10A one tag has an SNR of 20 and the other tag has an SNR of 15, in FIG. 10B one tag has an SNR of 15 and the other tag has an SNR of 10, in FIG. 10C one tag has an SNR of 10 and the other tag has an SNR of 5, in FIG. 10D the two tags each have an SNR of 20, and in FIG. 10E the two tags each have an SNR of 5. Similar to the histograms illustrated above in FIGS. 9A-9D, DM8 typically remains very close to 1 in the case of no collisions for various SNR and can vary quite far from 1 in the case of collisions. Particularly, if the difference in SNR between two tags is less than 5 dB, a threshold for DM8 can be used very effectively to distinguish between collision and no collision.

Yet another method to detect collisions involves the observation that, in the case of a collision, the magnitude of a number of LLRs will be very low. Each $|\lambda_i|$ for i=1, 2, . . . , 15 can be compared with a threshold. In several embodiments, a threshold can be set based on $\frac{1}{15}\sum_{i=1}^{15}|\lambda_i|$ or its normalized version. A count is taken for the number of times that $|\lambda_i|$ for i=1, 2, . . . , 15 is below the threshold. The count, referred to as an m-count, can be used as a decision metric by comparing it to an integer count threshold. In many embodiments, the count threshold is between 2 and 8 inclusive. A collision can be declared if the m-count is greater than the count threshold.

Next, consider a 2-bit (symbol) duration time. Assuming that the preamble is already detected, the LLR based on observed 2-bit (symbol) duration utilized for performing collision detection is as follows:

$$\lambda_i = |(r_{i-1,2} - r_{i,1}) + (r_{i,2} - r_{i+1,1})| - |(r_{i-1,2} - r_{i,1}) - (r_{i,2} - r_{i+1,1})| \qquad (31)$$

This LLR can be computed for i=1, 2, 3, . . . , 15, 16. For simplicity $A/\sigma^2$ is dropped in (28). On the edges of RN16, $r_{0,2}$ is known from the last one-half symbol observation from the preamble sequence. For $r_{17,1}$ if it is not available we can set $r_{17,1} = -r_{16,2}$. The method is based on observing $|\lambda_i|$ for i=1, 2, . . . , 16.

When there is no collision:

$$r_{i,j} = A_1 x_{i,j} e^{j\phi_1} + n_{i,j} \qquad (32)$$

For i=0, 1, 2, . . . , 16 and j=1, 2.

When there is a two tag collision the one-half symbol observations are:

$$r_{i,j} = A_1 x_{i,j} e^{j\phi_1} + A_2 x'_{i,j} e^{j\phi_2} + n_{i,j} \qquad (33)$$

For i=0, 1, 2, . . . , 16 and j=1, 2. All phases are unknown and uniformly distributed. As discussed further above, one-half symbols can be obtained at the output of a one-half symbol integrator by summing the number of samples per one-half symbol taken with a matched filter and correcting for timing as in equation (10).

One method to discriminate collision versus no collision is to use Kullback-Leibler divergence. For two density functions P and Q the Kullback-Leibler divergence is defined as:

$$D(P \parallel Q) = \sum_i P(i) \log \frac{P(i)}{Q(i)} \qquad (34)$$

Another method is to use variance of LLR over the 16-bit (symbol) received RN16 transmission as a decision metric. The variance can be defined as:

$$\text{Var} = \frac{1}{16}\sum_{i=1}^{16}|\lambda_i|^2 - \left(\frac{1}{16}\sum_{i=1}^{16}|\lambda_i|\right)^2 \qquad (35)$$

The variance can be compared to a threshold to detect collisions. In several embodiments of the invention, a threshold TH=m|corr| is utilized, where "corr" represents the result of preamble correlation normalized by the number of one half symbols used in the preamble, and m is a number that can be set based on a desired false detection probability appropriate to a specific application. Based on the above, the magnitude of "corr" can be expressed as:

$$|\text{corr}| = \frac{1}{2N_p}\left|\sum_{k,i} y_{k,i} p_{k,i}\right| \qquad (36)$$

If Var>TH then a collision is declared.

Figure 11A:
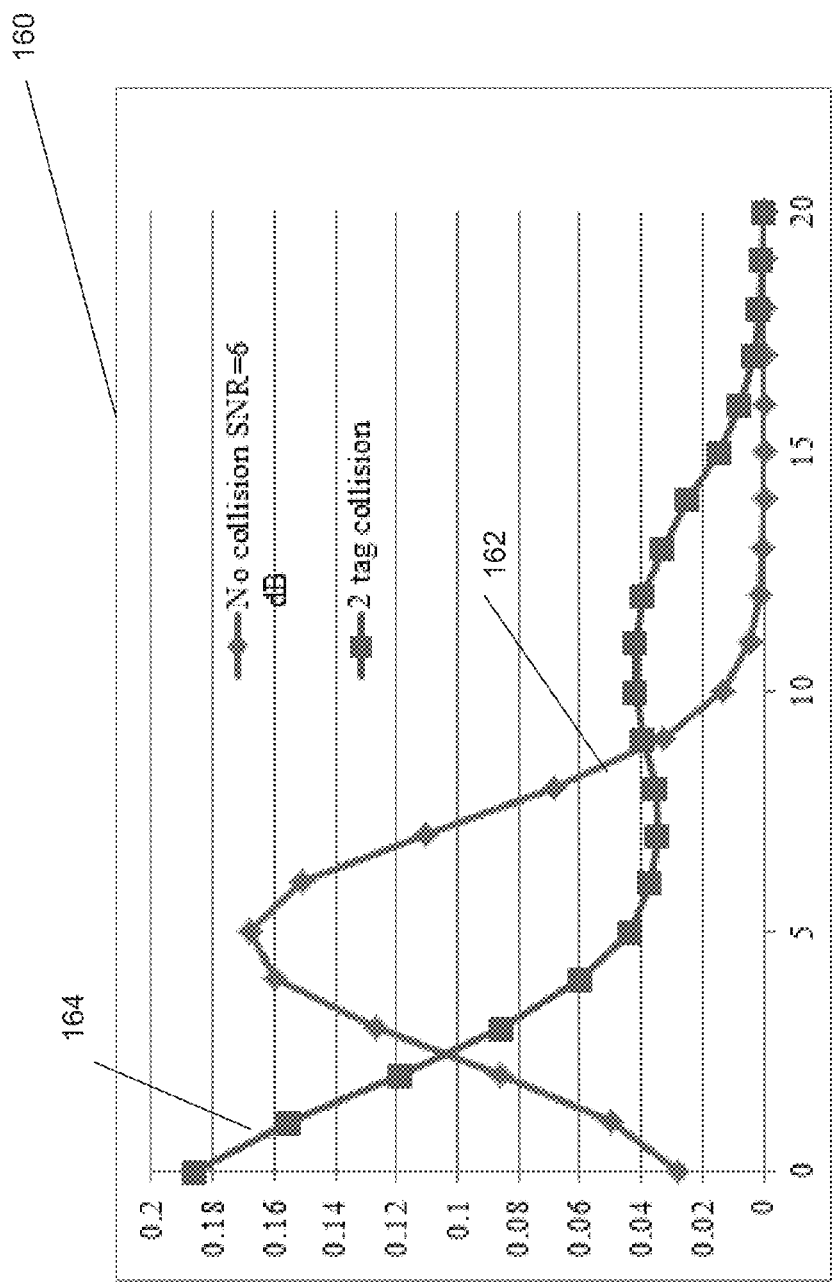
FIGS. 11A-11C are histograms illustrating LLR simulations for the cases of no collision and two tag collision using LLRs over two symbol sequences.

A histogram of LLR simulations for two cases of no collision and two tag collision where the received SNR of each tag is the same is illustrated in FIG. 11A. The histogram 160 illustrates a curve 162 of the probability that the magnitude of an LLR is a certain value plotted against possible values for the magnitude of an LLR when there is no collision and the RFID tag has a Signal to Noise Ratio (SNR) of 6 dB. A curve 164 shows the probability that the magnitude of an LLR is a certain value plotted against possible values for the magnitude of an LLR when there is a two tag collision where each tag has a SNR of 6 dB. As can be seen in the chart, the curve 162 for no collision lies mostly between 0 and 10 and peaks sharply near a mean value. Meanwhile, the curve 164 for collision drops from a high sharply between 0 and 5 and remains low from 5 to 10.

Figure 11B:
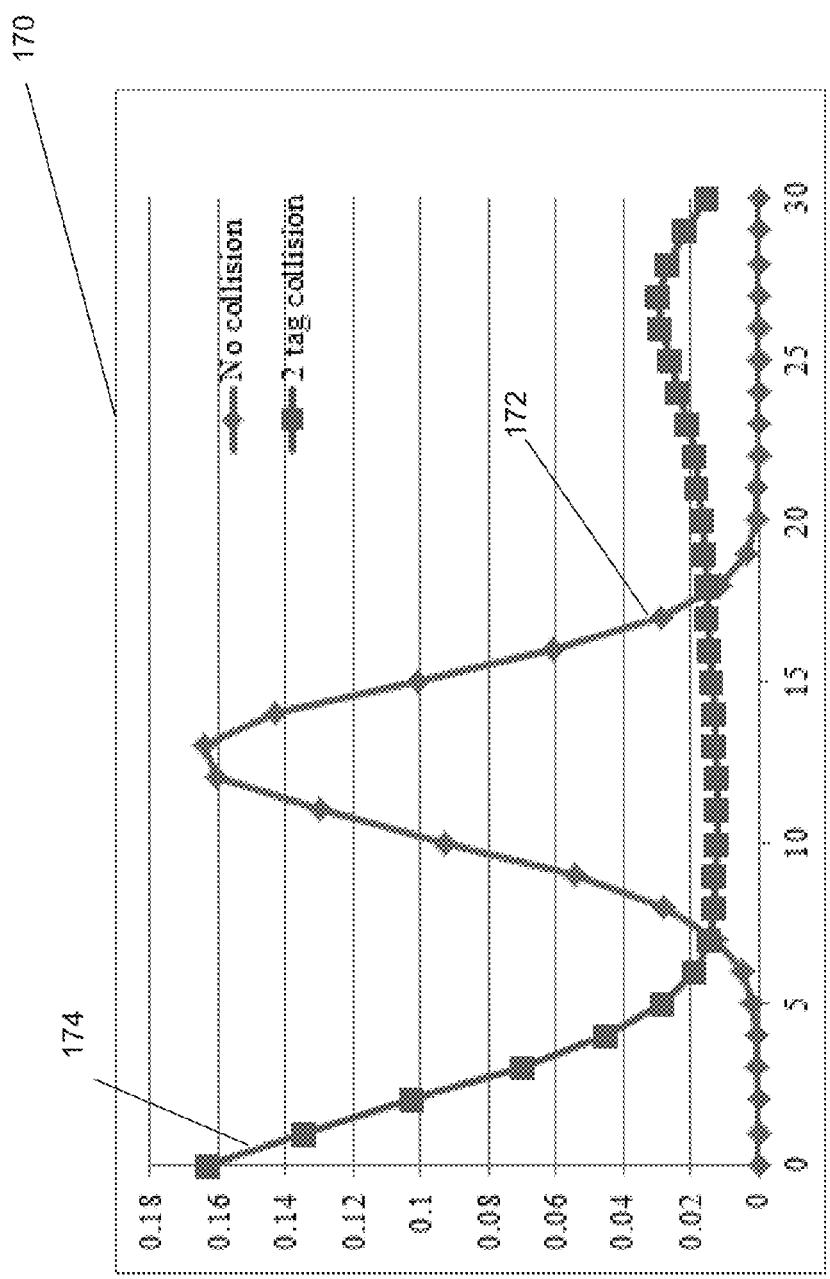
Figure 11C:
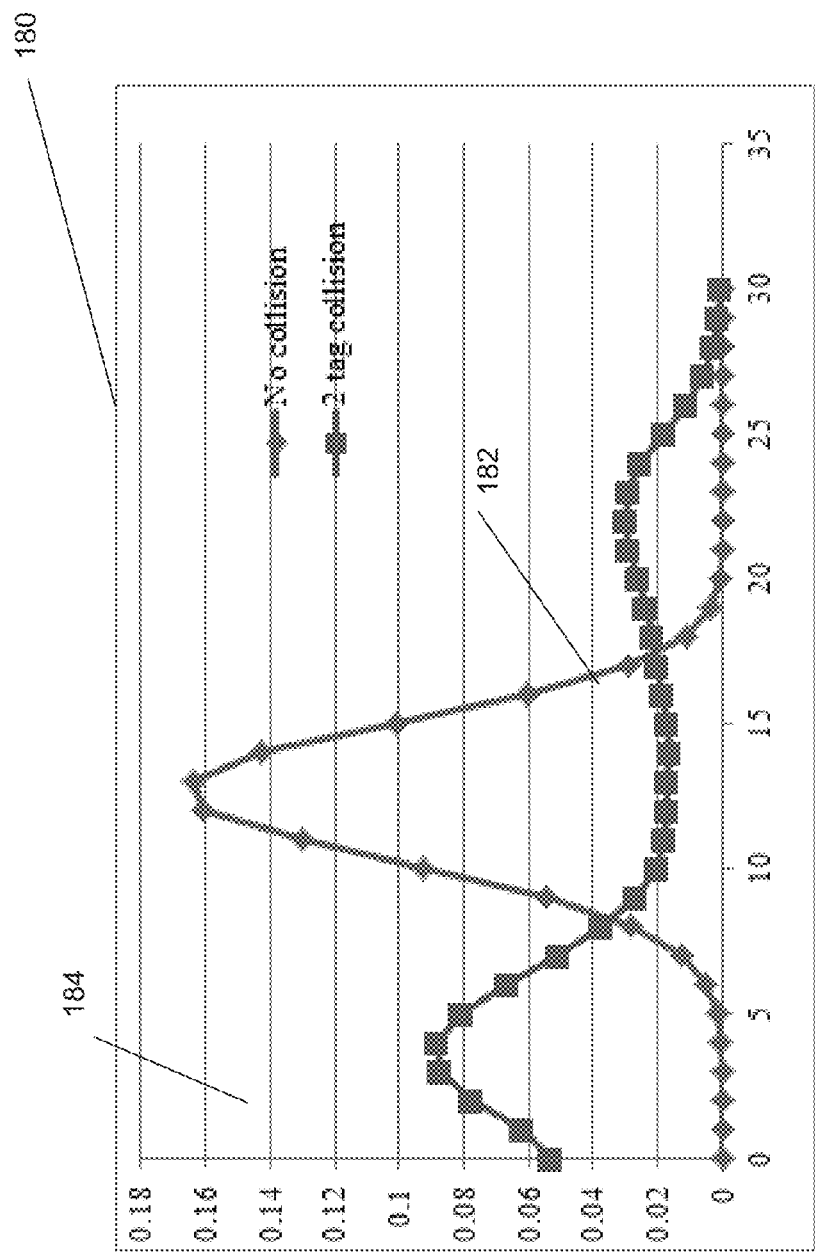

Similarly, a histogram of LLR simulations for two cases of no collision and a two tag collision where the received SNR of each tag is 12 dB is illustrated in FIG. 11B. Similar to FIG. 11A, the curve 172 for no collision lies mostly between 7 and 18 and peaks sharply near a mean value. The curve 174 for collision drops from a high sharply between 0 and 5 and remains low from 5 to 30. A histogram of LLR simulations where the received SNR of one tag is 12 dB and the other tag is 9 dB is illustrated in FIG. 11C. Similarly again, the curve 182 for no collision lies mostly between 0 and 18 and peaks sharply near a mean value. The curve 184 for collision has a smaller peak near 5 and remains low from 10 to 30.

From the stark differences in the shape of these curves for the case of collision versus the case of no collision, it can be seen that the variance as computed in equation (35) and other techniques for describing the shape of a distribution that are discussed further above (e.g., using central moment about the mean) can be used to distinguishes between the two cases. For example, variance measures the spread of a distribution. In FIGS. 6A and 6B it can be seen that the curves in the case of no collision are narrower than the curves in the case of collision, and therefore the variance will be smaller. Using variance as in equation (35) and a threshold TH=m|corr| using equation (36), an m can be chosen to give a threshold TH that can distinguish between the variance of a curve where there is no collision and the variance of a curve where there is a collision.

Figure 12A:
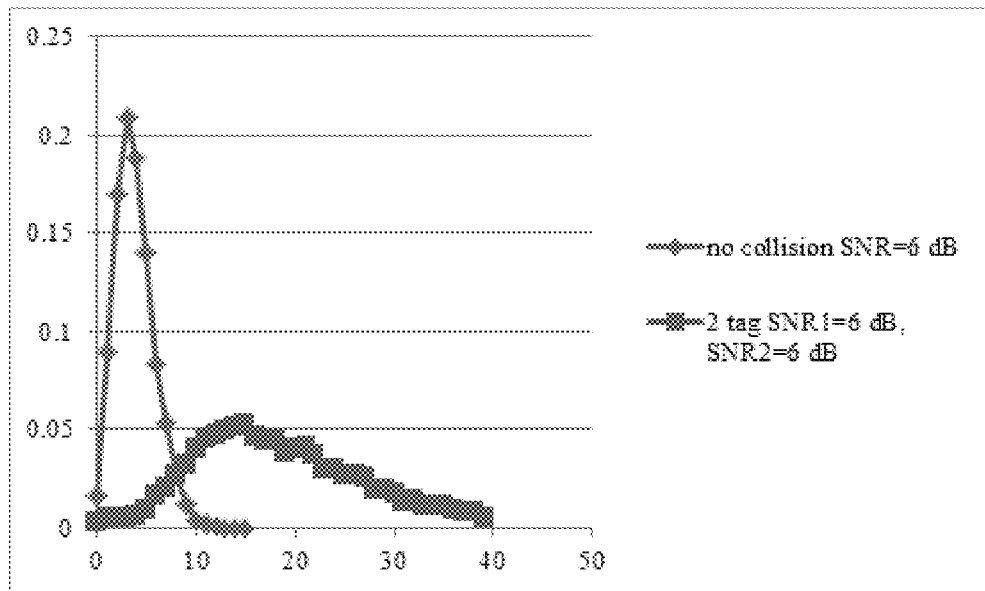
FIGS. 12A-12D are histograms illustrating simulations of the variance Var for the cases of no collision and two tag collision using LLRs over two symbol sequences.
Figure 12B:
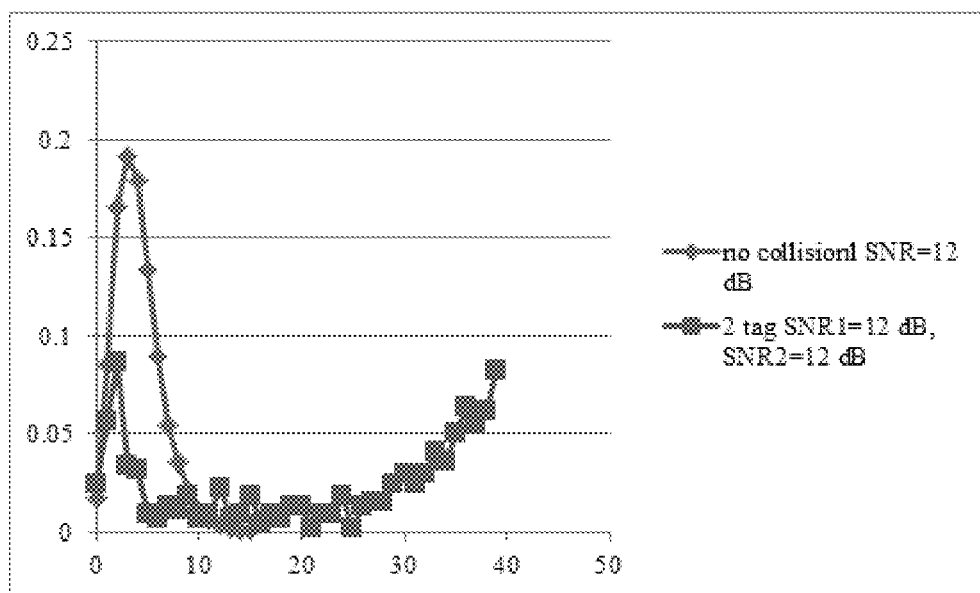
Figure 12C:
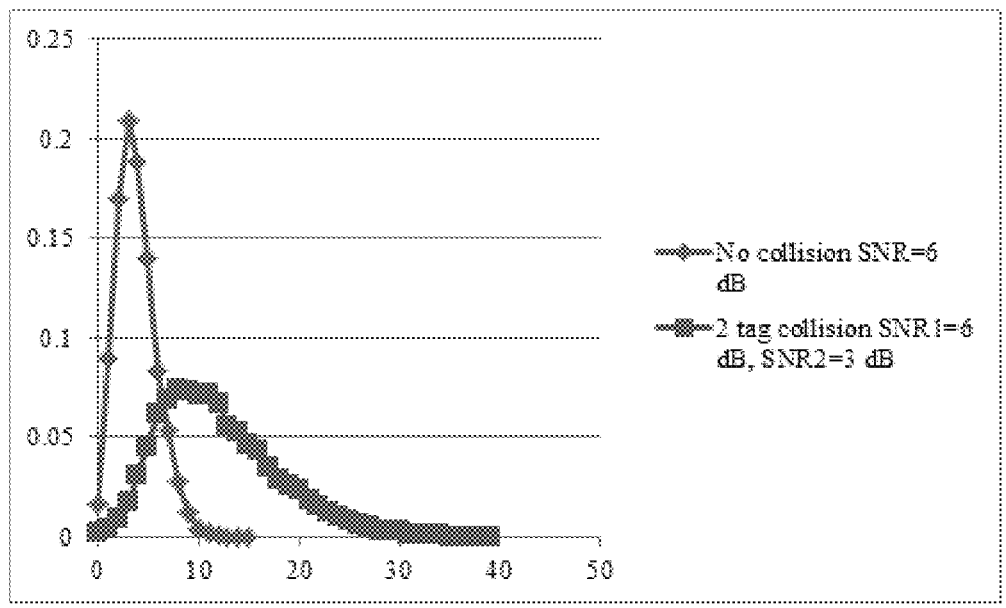
Figure 12D:
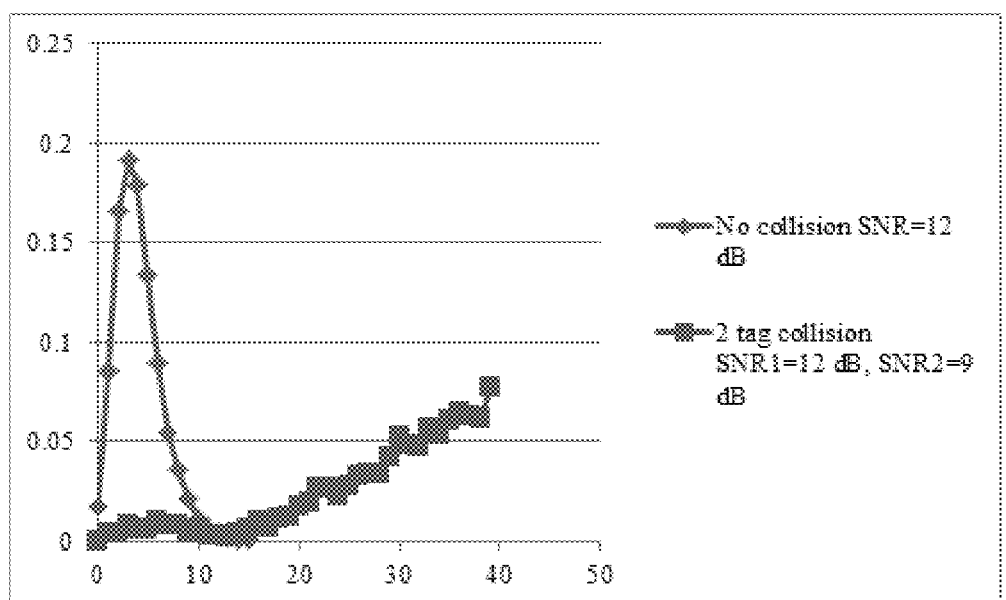

Histograms of the variance Var for the cases of no collision and two tag collision are illustrated in FIGS. 12A-12D. In FIG. 12A the two tags have an SNR of 6 dB, in FIG. 12B the two tags have an SNR of 12 dB, in FIG. 12C one tag has an SNR of 6 dB while the other tag has an SNR of 3 dB, and in FIG. 12D one tag has an SNR of 12 dB while the other tag has an SNR of 9 dB. As can be seen in the figures, the curves for the case of no collision and the case of a collision concentrate and peak around different values. Particularly where the SNR is higher (9 and 12 dB) there is very little overlap in the curves of Var. Accordingly, a threshold TH can be determined using the equations described above for effectively distinguishing between collision and no collision.

Figure 13A:
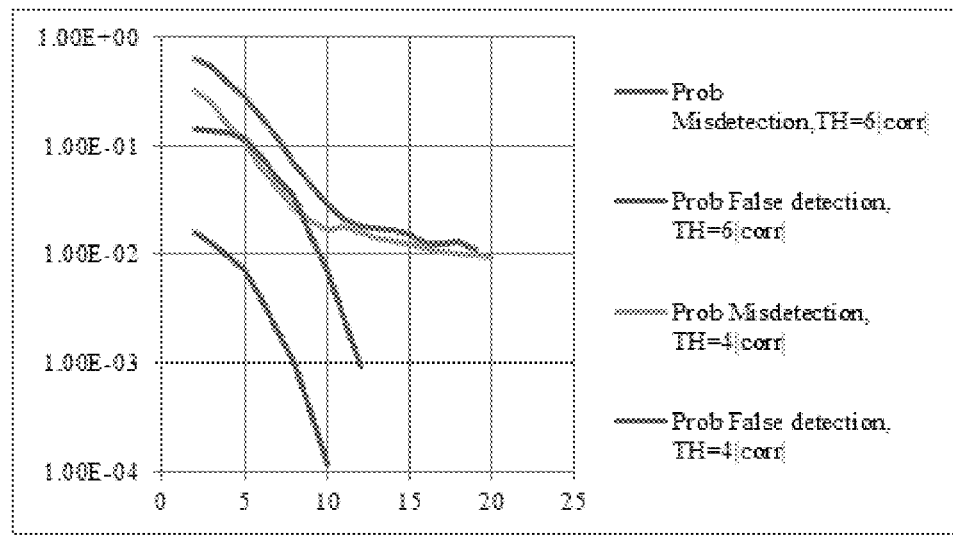
FIGS. 13A and 13B are charts illustrating the simulated probability of false detection and the probability of miss detection for the cases of no collision and a two tag collision using LLR over two symbol sequences and the variance of LLR as a decision metric.

A simulation of the probability of a false detection and the probability of a miss detection using LLR as in equation (31) and the variance of LLR as in equation (35) as a decision metric when the colliding tags have the same SNR is illustrated in FIG. 13A. As can be seen from the chart, both the probability of false detection and the probability of miss detection decrease with increased SNR, even for different thresholds TH=m|corr| where m=4 and 6. The probability of false detection trails off considerably relative to the probability of miss detection 134 with increased SNR due to the effectiveness of the threshold in identifying two tag collisions. As can be seen in the charts, lowering m in TH=m|corr| reduces both the probably of false detection and the probability of miss detection.

Figure 13B:
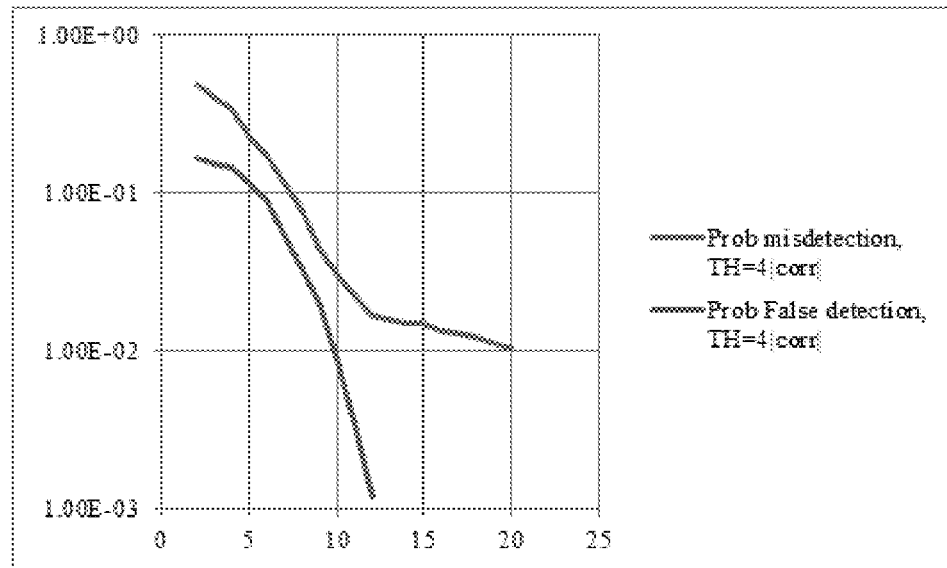

FIG. 13B is a similar chart to FIG. 13A with the exception that the simulation involves a two tag collision where the SNR of the signal received from the first tag is 3dB greater than the signal received from the second tag. As can be seen from the chart, the probability of false detection and the probability of miss detection exhibit similar characteristics even when the signal of one tag dominates. Accordingly, the simulations indicate that the stronger the received signal the more likely that the LLR magnitude output by the multiple symbol noncoherent soft output detector can be utilized to accurately detect collisions.

Although specific procedures for performing collision detection in RFID system using LLR magnitudes are discussed above, any of a variety of techniques utilizing LLR magnitudes and/or other soft metrics can be utilized to perform collision detection in a variety of applications including (but not limited to) RFID tag interrogation in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A receiver system, comprising:
a receiver configured to receive and sample a phase modulated input signal; and
a multiple symbol noncoherent soft output detector configured to receive the sampled input signal and to generate a soft metric indicative of the reliability of a detected symbol based upon observations over multiple symbols;
a collision detector configured to calculate a decision metric from a set of soft metrics generated by the multiple symbol noncoherent soft output detector and detect a collision when the decision metric satisfies a predetermined criterion.

2. The receiver system of claim 1, wherein the soft metric is the Log Likelihood Ratio of the detected symbol based upon observations over multiple symbols.

3. The receiver system of claim 2, wherein the observations include observations over a two symbol sequence.

4. The receiver system of claim 2, wherein the observations include observations over a three symbol sequence.

5. The receiver system of claim 1, wherein the set of soft metrics generated by the multiple symbol noncoherent soft output detector are generated based upon observations of a unique sequence of symbols identifying an RFID tag.

6. The receiver system of claim 5, wherein the unique sequence of symbols identifying an RFID tag is an RN16 transmission.

7. The receiver system of claim 1, wherein the decision metric is based upon a central moment of the distribution of the set of soft metrics generated by the multiple symbol noncoherent soft output detector.

8. The receiver system of claim 7, wherein the decision metric is normalized over a power of the first moment of the distribution of the set of soft metrics generated by the multiple symbol noncoherent soft output detector.

9. The receiver system of claim 7, wherein the predetermined criterion is the decision metric exceeding a threshold.

10. The receiver system of claim 9, wherein the phase modulated input signal includes a preamble sequence and the threshold is based upon the preamble correlation normalized by the number of one half symbols used in the preamble.

11. The receiver system of claim 1, wherein the decision metric is a count of the number of soft metrics in the set of soft metrics generated by the multiple symbol noncoherent soft output detector.

12. The receiver system of claim 1, wherein:
the phase modulated input signal comprises data that is phase modulated on a carrier; and
the multiple symbol differential detector assumes that carrier phase of the input signal is constant over the time duration of the observations.

13. The receiver system of claim 12, wherein the phase modulated input signal is a binary phase modulated signal.

14. The receiver system of claim 12, wherein the phase modulated input signal is an FM0 modulated signal.

15. The receiver system of claim 12, wherein the phase modulated input signal is a Multiple-Phase-Shift Keying modulated signal.

16. The receiver system of claim 1, wherein:
the multiple symbol differential detector comprises a plurality of matched filters having different numbers of samples configured to integrate the samples during each half-symbol period; and
the multiple symbol differential detector is configured to use the outputs of each of the plurality of matched filters to determine the most likely symbol duration.

17. The receiver system of claim 1, further comprising an antenna configured to receive a phase modulated signal comprising symbols transmitted by an RFID tag.

18. A method for detecting collisions in received radio frequency transmissions, the method comprising:
receiving and sampling a phase modulated input signal to produce symbol samples;
combining symbol samples to produce symbol observations;
generating a soft metric indicative of the reliability of a detected symbol based upon symbol observations over multiple symbols;
calculating a decision metric from a set of generated soft metrics; and
detecting a collision in received radio frequency transmissions when the calculated decision metric satisfies a predetermined criterion.

19. The method of claim 18, wherein the soft metric is the Log Likelihood Ratio of the detected symbol based upon observations over multiple symbols.

20. The method of claim 19, wherein the observations include observations over a two symbol sequence.

* * * * *